(12) United States Patent
Horen et al.

(10) Patent No.: US 11,275,806 B2
(45) Date of Patent: *Mar. 15, 2022

(54) DYNAMIC MATERIALIZATION OF FEEDS FOR ENABLING ACCESS OF THE FEED IN AN ONLINE SOCIAL NETWORK

(71) Applicant: salesforce.com, inc., San Francisco, CA (US)

(72) Inventors: Gary Horen, Seattle, WA (US); Lorenzo Minore, Seattle, WA (US); Matthew Van Wely, Lake Stevens, WA (US)

(73) Assignee: salesforce.com, inc., San Francisco, CA (US)

( * ) Notice: Subject to any disclaimer, the term of this patent is extended or adjusted under 35 U.S.C. 154(b) by 202 days.

This patent is subject to a terminal disclaimer.

(21) Appl. No.: 16/691,050

(22) Filed: Nov. 21, 2019

(65) Prior Publication Data

US 2020/0089722 A1 Mar. 19, 2020

Related U.S. Application Data

(63) Continuation of application No. 15/721,581, filed on Sep. 29, 2017, now Pat. No. 10,558,723.

(51) Int. Cl.
*G06F 16/9535* (2019.01)
*H04L 67/02* (2022.01)
(Continued)

(52) U.S. Cl.
CPC .... *G06F 16/9535* (2019.01); *G06F 16/24568* (2019.01); *G06F 16/25* (2019.01);
(Continued)

(58) Field of Classification Search
CPC ......... H04L 67/02; H04L 67/22; G06F 16/25; G06F 16/24568; G06F 16/9535; G06Q 50/01
See application file for complete search history.

(56) References Cited

U.S. PATENT DOCUMENTS 9,063,632 B2 * 6/2015 Beechuk ............. G06F 3/04842
2007/0156809 A1 * 7/2007 Dickinson ............. G06Q 10/06
709/203

(Continued)

FOREIGN PATENT DOCUMENTS

JP 2018018550 A 2/2018

OTHER PUBLICATIONS

Joseph M. Hellerstein et al., "Architecture of a Database System," Foundations and Trends in Databases, vol. 1, No. 2, 2007, pp. 141-259.

(Continued)

*Primary Examiner* — Etienne P Leroux
(74) *Attorney, Agent, or Firm* — Nicholson De Vos Webster & Elliott LLP

(57) ABSTRACT

Dynamic materialization of a feed is described. A request for a feed is received. A state of the feed is determined. Responsive to determining that the state is the inactive state, causing materialization of the feed in a second non-relational database system with feed items of the feed from the first relational database system, where the second database system is separate from the first database system, and setting the state of the feed to the activating state. Responsive to determining that the state is the active state, causing the request for the feed to be processed from the second non-relational database system.

24 Claims, 13 Drawing Sheets

(51) Int. Cl.
*G06F 16/2455* (2019.01)
*G06F 16/25* (2019.01)
*G06Q 50/00* (2012.01)
*H04L 67/50* (2022.01)

(52) U.S. Cl.
CPC .............. *H04L 67/02* (2013.01); *G06Q 50/01* (2013.01); *H04L 67/22* (2013.01)

(56) References Cited

U.S. PATENT DOCUMENTS

| | | | |
|---|---|---|---|
| 2012/0179782 A1 | 7/2012 | Silberstein et al. | |
| 2014/0280134 A1 | 9/2014 | Horen et al. | |
| 2014/0280329 A1 | 9/2014 | Beechuk et al. | |
| 2015/0331901 A1* | 11/2015 | Olsen | G06F 16/2365 707/738 |
| 2016/0103591 A1* | 4/2016 | Beechuk | G06Q 30/01 715/738 |
| 2018/0083344 A1* | 3/2018 | Han | H01Q 19/021 |
| 2018/0225703 A1* | 8/2018 | State | G06Q 50/01 |
| 2018/0357285 A1 | 12/2018 | Horen | |
| 2019/0102467 A1 | 4/2019 | Horen et al. | |
| 2019/0104189 A1 | 4/2019 | Horen | |
| 2019/0163784 A1 | 5/2019 | Horen | |

OTHER PUBLICATIONS

Joseph M. Hellerstein et al., "Anatomy of a Database System," Readings in Database Systems, Fourth Edition, The MIT Press, 2005, pp. 42-95.

Jan Van Den Bussche et al., "Translating SQL into the Relational Algebra," retrieved from: https://cs.ulb.ac.be/public/_media/teaching/infoh417/sql2alg_eng.pdf Oct. 2016, pp. 1-19.

Michael Kifer et al., "Database Systems: An Application-Oriented Approach," Complete Version, Second Edition, Pearson Addison Wesley, ISBN-13: 978-0321268457, Mar. 26, 2005, parts 1-6 (1,245 pages).

Notice of Allowance, U.S. Appl. No. 15/721,581, dated Oct. 21, 2019, 8 pages.

Notice of Allowance, U.S. Appl. No. 15/721,581, dated Dec. 11, 2019, 7 pages.

* cited by examiner

DYNAMIC MATERIALIZATION OF FEEDS FOR ENABLING ACCESS OF THE FEED IN AN ONLINE SOCIAL NETWORK

CROSS-REFERENCE TO RELATED APPLICATIONS

This application is a continuation of application Ser. No. 15/721,581, filed Sep. 29, 2017, which is hereby incorporated by reference.

TECHNICAL FIELD

One or more implementations relate to the field of online social network using a database system; and more specifically, to the dynamic materialization of feeds for enabling access of the feed in an online social network.

BACKGROUND

A social networking service is an online service, platform, or site that focuses on facilitating the building of social networks or social relations among people who may share interests, activities, real-life connections, or backgrounds. A social network service consists of a representation or profile for each user, his/her social links, and a variety of additional services. Most social network services are web-based and provide a way for users to interact over the internet, such as e-mail and instant messaging. Social networking sites allow users to share ideas, activities, events, and interests within their individual networks. Popular social networking services include Facebook™, Google+™, Twitter™, LinkedIn™, YouTube™, Foursquare™, Yelp™, Expedia™, MySpace™, and Flickr™. An individual may use many social networking sites, each which enable the individual to interact with other users via countless social network communications, or network feeds. Some social networking systems are enterprise social networking systems, which are increasingly becoming a common way to facilitate communication among people, any of whom can be recognized as users of the social networking system. One example of an enterprise social networking system is Chatter®, provided by salesforce.com, inc. of San Francisco, Calif.

In some social networking systems, users can access one or more social network feeds, which include information updates presented as items or entries in the feed. Such a feed item can include a single information update or a collection of individual information updates. A feed item can include various types of data including character-based data, audio data, image data and/or video data. A social network feed can be displayed in a graphical user interface (GUI) on a display device such as the display of a computing device. The information updates can include various social network data from various sources and can be stored in an on-demand database service environment.

The social networking systems generate personalized feeds which are delivered to various users and/or accessed by applications and processes for providing value added services or analytics based on these feeds. In some exemplary implementations, to provide a low-latency service the social networking systems buffer the feeds in tables. This process may be referred to as feed materialization where a materialized view of the feed is generated. The materialized view may be buffered to be viewed by the user upon request or alternatively may be pushed to the user by the social networking system. Social networking systems see a significant increase in the number of their users as well as the number of feeds that an entity, be it a user or an application, would like to view or access. Materializing all possible feeds of users of a social networking system is a time consuming task that would require significant storage and computing resources.

BRIEF DESCRIPTION OF THE DRAWINGS

The following figures use like reference numbers to refer to like elements. Although the following figures depict various exemplary implementations, alternative implementations are within the spirit and scope of the appended claims. In the drawings:

DETAILED DESCRIPTION

Figure 1A:
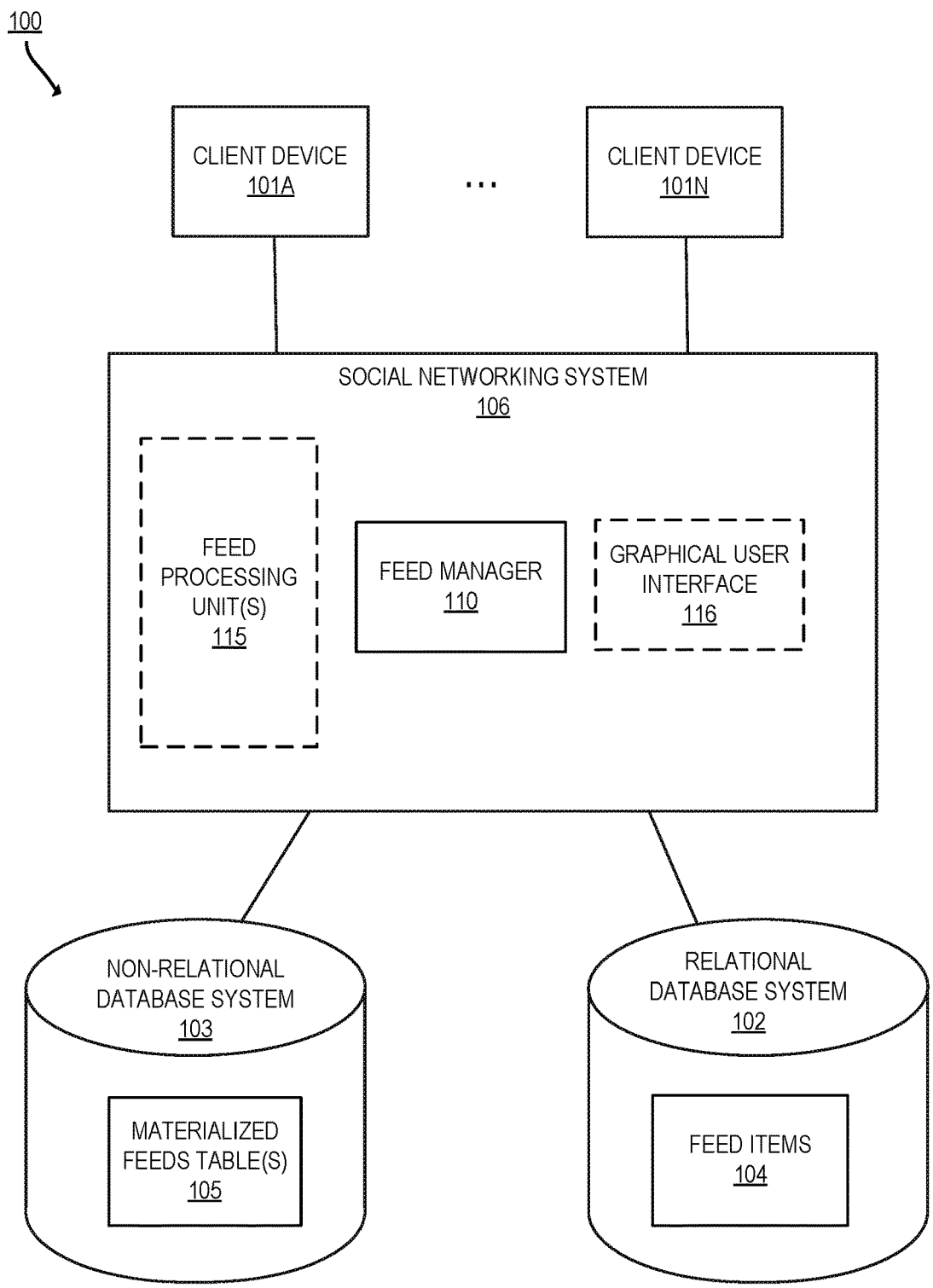
FIG. 1A illustrates a block diagram of an exemplary environment in which a social networking system can be used according to one implementation.

The following description describes methods and apparatus for dynamic materialization of feeds for enabling access of the feed in an online social network. In the following description, a feed is materialized on a first read, for example when it is first requested by a user or an application, and a state of the feed is set. The state of the feed is monitored and updated to enable the requesting entity to access the feed from a set of materialized feeds stored in a non-relational database or alternatively from records including one or more feeds stored in a relational database.

In one implementation, the methods and apparatuses described herein enable access of a feed by performing the dynamic materialization of feeds in a social networking system. The social networking system receives a request for a feed, where the feed is defined based on two or more parameters. Upon receipt of the request, the social networking system determines a state of the feed, where the state of the feed can be at least any one of an active state, an inactive state, an activating state, an inactivating state, and a disabled state. Responsive to determining that the state of the feed is the inactive state, the social networking system performs the following: causing the request for the feed to be processed at a first relational database system, and causing materialization of the feed by populating a materialized feeds table in a second non-relational database system with feed items of the feed from the first relational database system, and setting the state of the feed to the activating state. Responsive to determining that the state of the feed is the active state, the social networking system causes the request for the feed to be processed from the materialized feeds table in the second non-relational database system. Responsive to determining that the state of the feed is the inactivating state, the social networking system causes the request for the feed to be processed from the first relational database system. Responsive to determining that the state of the feed is the disabled state, the social networking system performs the following: causing the request for the feed to be processed from the first relational database system, and causing an update of the materialized feeds table in the second non-relational database system to be postponed for a predetermined amount of time.

The implementation presented herein provide several advantages when compared with existing solutions of feed materialization of feeds. The mechanisms enable to reduce computational demands on the social networking system and the database storing the feed items when comes time to read the feed by enabling materialization of feeds that were recently requested. In addition, the use of a separate data structure (a non-relational database system) to store the materialized feeds ensures that the integrity of the raw data is always maintained as the materialized feeds are not the data itself. The materialized feeds are the end result of munging data and not the data itself that is stored in the relational database system. Processes and users can access the materialized feeds from the second non-relational database with a quick and efficient look up after determining that the state of the feed is active. Processes and users need to retrieve the data from the relational database when the state of the feed is in any other state ensuring that accurate and updated data is provided to the processes and the users at all time.

FIG. 1A illustrates a block diagram of an exemplary environment in which a social networking system can be used according to one implementation. The environment 100 includes client devices 101A-N, the social networking system 106, a relational database system 102, and non-relational database system 103. The environment 100 enables users to access through the client devices 101A-N the social networking system 106 that offers a social networking service. The social networking system 106 enables the users of the client devices 101A-N to communicate with one another, view and share updates regarding cases, accounts, or opportunities, etc. The various components of the environment 100 may be part of a network (not illustrated) that couples the components to one another. For example, the network can be any one or any combination of a LAN (local area network), WAN (wide area network), telephone network, wireless network, point-to-point network, star network, token ring network, hub network, or other appropriate configuration. The network can include a TCP/IP (Transfer Control Protocol and Internet Protocol) network, such as the global internetwork of networks often referred to as the "Internet" with a capital "I." While the Internet is used as an example herein, it should be understood that the networks that the present implementations might use are not so limited.

The client devices 101A-N allow users of the social networking service to access the service and view one or more feeds. The client devices 101A-N are electronic devices (e.g., laptop, workstation, smartphone, palm top, mobile phone, tablets, gaming system, set-top box, etc.) that are capable of accessing network resources (e.g., they include software such as client network applications (e.g., web browsers, mobile applications, etc.) that are capable of accessing network resources) and connect to the social networking system 106 for requesting a feed. The client devices 101A-N may be coupled to the social networking system 106 through a network (not illustrated).

For example, each client device 101A-N could include a desktop personal computer, workstation, laptop, PDA, cell phone, or any wireless access protocol (WAP) enabled device or any other computing device capable of interfacing directly or indirectly to the Internet or other network connection. In one exemplary implementation, a client device may run an HTTP client, e.g., a browsing program, such as Microsoft's Internet Explorer browser, Netscape's Navigator browser, Opera's browser, or a WAP-enabled browser in the case of a cell phone, PDA or other wireless device, or the like, allowing a user (e.g., subscriber of the social networking service) of the client device to access, process and view information, pages and applications available to it from social networking system 106 over a network.

The social networking system 106 implements an online social networking service, platform, or site that focuses on facilitating the building of social networks or social relations among people who may share interests, activities, real-life connections, or backgrounds. The social networking system 106 includes a feed manager 110, an optional graphical user interface 116, and one or more optional feed processing unit(s) 115. The social networking system 106 may include one or more other components for offering the social networking system to the users of the client devices 101A-N. These additional components are not illustrated to allow for ease of understanding of the present implementations, and this should not be considered as limiting.

The feed manager 110 is operative to receive requests for one or more feeds and to update the feeds. The feed manager 110 may receive requests from a user through one of the client devices 101A-N. The user may want to view the feed on a graphical user interface of the social networking service. In another implementation, the feed manager 110 may receive requests for one or more feeds from one of the feed processing units 115. These processing units can be background applications of the social networking service that processes feeds of users. The processing units can request to access in response to an action performed by a user. For example, the user may want to highlight a feed item in a feed that he is viewing. In another example, the user may want to delete a feed item from a feed. Other examples of processing units can be contemplated without departing from the scope of the implementations described herein.

A feed, which can also be referred to as a social networking feed, includes information updates presented as items or entries in the feed. Such a feed item can include a single information update or a collection of individual information updates. A social network feed can be displayed in a graphical user interface (GUI) on a display device such as the display of an electronic device (e.g., one of the client devices 101A-N). The feed items can include social network data from various sources and can be stored in an on-demand database service environment. For example, the feed items can be stored as feed items 104 in the relational database system 102. The terms "information feed" and "feed" are used interchangeably herein and generally refer to a combination (e.g., a list) of feed items or entries with various types of information and data. Such feed items can be stored and maintained in one or more database tables, e.g., as rows in the table(s), that can be accessed to retrieve relevant information to be presented as part of a displayed feed. The term "feed item" (or feed element) refers to an item of information, which can be presented in the feed such as a post submitted by a user. Feed items of information about a user can be presented in a user's profile feed of the database, while feed items of information about a record can be presented in a record feed in the database, by way of example. A profile feed and a record feed are examples of different information feeds. A second user following a first user and a record can receive the feed items associated with the first user and the record for display in the second user's news feed, which is another type of information feed. In some implementations, the feed items from any number of followed users and records can be combined into a single information feed of a particular user.

As examples, a feed item can be a message, such as a user-generated post of text data, and a feed tracked update to a record or profile, such as a change to a field of the record. Feed tracked updates are described in greater detail below. A feed can be a combination of messages and feed tracked updates. Messages include text created by a user, and may include other data as well. Examples of messages include posts, user status updates, and comments. Messages can be created for a user's profile or for a record. Posts can be created by various users, potentially any user, although some restrictions can be applied. As an example, posts can be made to a wall section of a user's profile page (which can include a number of recent posts) or a section of a record that includes multiple posts. The posts can be organized in chronological order when displayed in a graphical user interface (GUI), for instance, on the user's profile page, as part of the user's profile feed. In contrast to a post, a user status update changes a status of a user and can be made by that user or an administrator. A record can also have a status, the update of which can be provided by an owner of the record or other users having suitable write access permissions to the record. The owner can be a single user, multiple users, or a group. In one implementation, there is only one status for a record.

In some implementations, a comment can be made on any feed item. In some implementations, comments are organized as a list explicitly tied to a particular feed tracked update, post, or status update. In some implementations, comments may not be listed in the first layer (in a hierarchal sense) of feed items, but listed as a second layer branching from a particular first layer feed item.

A "group" is generally a collection of users. In some implementations, the group may be defined as users with a same or similar attribute, or by membership. In some implementations, a "group feed", also referred to herein as a "group news feed", includes one or more feed items about any user in the group. In some implementations, the group feed also includes information updates and other feed items that are about the group as a whole, the group's purpose, the group's description, and group records and other objects stored in association with the group. Threads of information updates including group record updates and messages, such as posts, comments, likes, etc., can define group conversations and change over time.

An "entity feed" or "record feed" generally refers to a feed of feed items about a particular record in the database, such as feed tracked updates about changes to the record and posts made by users about the record. An entity feed can be composed of any type of feed item. Such a feed can be displayed on a page such as a web page associated with the record, e.g., a home page of the record. As used herein, a "profile feed" or "user's profile feed" is a feed of feed items about a particular user. In one example, the feed items for a profile feed include posts and comments that other users make about or send to the particular user, and status updates made by the particular user. Such a profile feed can be displayed on a page associated with the particular user. In another example, feed items in a profile feed could include posts made by the particular user and feed tracked updates initiated based on actions of the particular user.

The social networking system 106 may allow a user to follow data objects in the form of records such as cases, accounts, or opportunities, in addition to following individual users and groups of users. The "following" of a record, a user or a group of users stored in a database, allows a user to track the progress of that record, user or group of users. Updates associated with the followed entity (i.e., a record, user, or group of users) are one type of information update that can occur and be noted on a social network feed such as an entity feed or a news feed of a user subscribed to the entity.

Information updates can include various types of updates, which may or may not be linked with a particular record. For example, information updates can be user-submitted messages or can otherwise be generated in response to user actions or in response to events. Examples of messages include: posts, comments, indications of a user's personal preferences such as "likes" and "dislikes", updates to a user's status, uploaded files, and user-submitted hyperlinks to social network data or other network data such as various documents and/or web pages on the Internet. Posts can include alpha-numeric or other character-based user inputs such as words, phrases, statements, questions, emotional expressions, and/or symbols. Comments generally refer to responses to posts or to other information updates, such as words, phrases, statements, answers, questions, and reactionary emotional expressions and/or symbols. Multimedia data can be included in, linked with, or attached to a post or comment. For example, a post can include textual statements in combination with a JPEG image or animated image. A like or dislike can be submitted in response to a particular post or comment. Examples of uploaded files include presentations, documents, multimedia files, and the like.

The feed manager 110 can generate a feed in response to a request for the feed using one of two mechanisms: either by a request to retrieve all feed items associated with the feed from the relational database system 102; or alternatively by a request to the non-relational database system 103 to retrieve the feed from the materialized feeds tables 105. The two approaches are distinct and have significantly different response latencies as will be described in further details with reference to FIG. 1B.

Figure 1B:
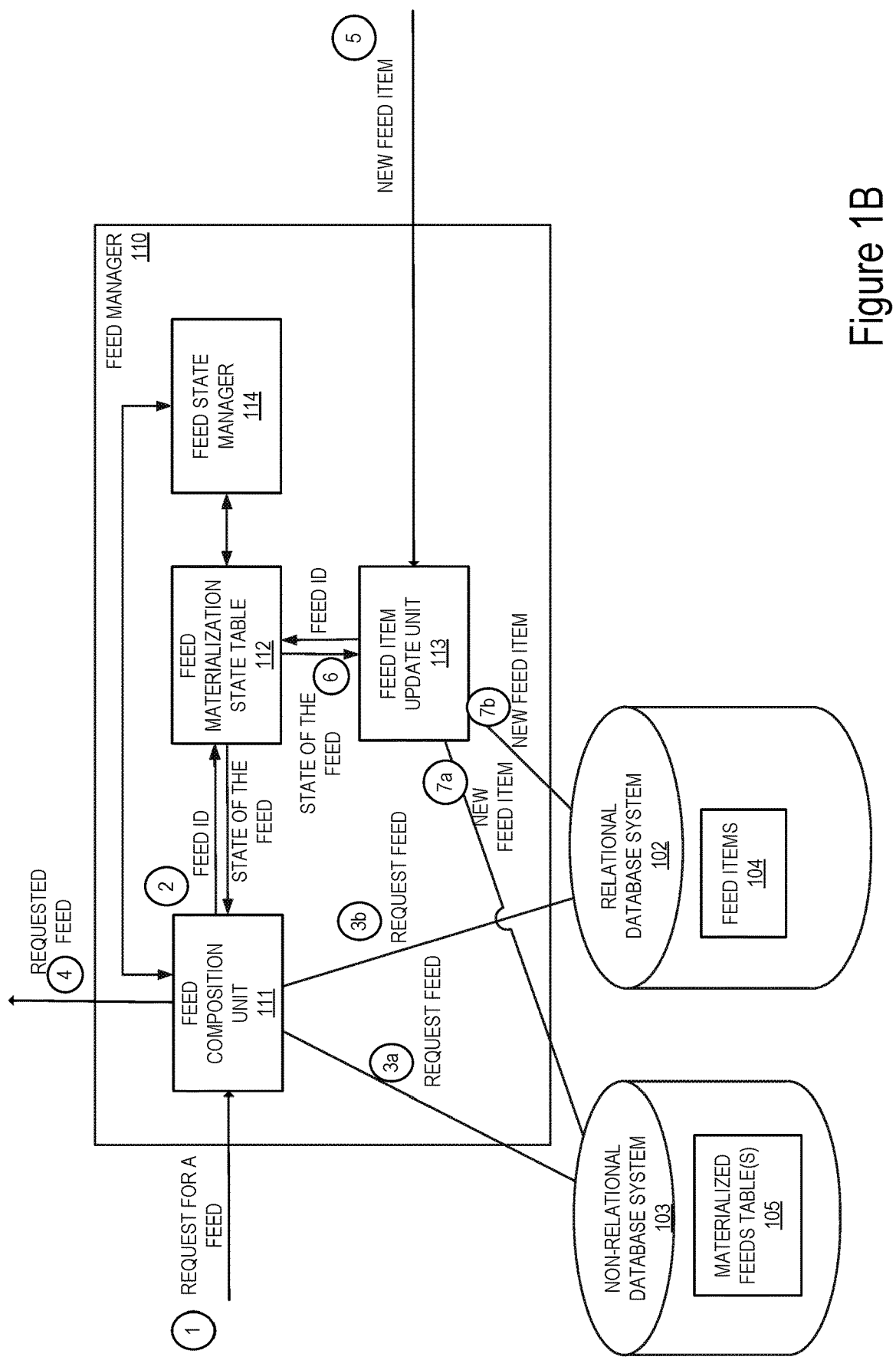
FIG. 1B illustrates a block diagram of an exemplary feed manager coupled with a relational database system and a non-relational database system according to one implementation.

FIG. 1B illustrates a block diagram of an exemplary feed manager 110 coupled with a relational database system and a non-relational database system according to one implementation.

The feed manager 110 includes a feed composition unit 111, a feed materialization state table 112, a feed state manager 114, and a feed item update unit 113. The feed manager 110 is coupled with at least two database systems. A first database system, the relational database system 102 that stores feed items.

The relational database system 102 is used to store records related to the users of the social networking system. The relational database system 102 stores several records. In some implementations the relational database system 102 is implemented as described in further details with reference to FIG. 12, where the database management system 1212 is the relational database system 102 and the feed manager 110 acts as a client of this database system transmitting requests for obtaining feed items that form a feed from the database management system 1212

The term "record" generally refers to a data entity, such as an instance of a data object created by a user of the database service, for example, about a particular (actual or potential) business relationship or project. The data object can have a data structure defined by the database service (a standard object) or defined by a user (custom object). For example, a record can be for a business partner or potential business partner (e.g., a client, vendor, distributor, etc.) of the user, and can include information describing an entire company, subsidiaries, or contacts at the company. As another example, a record can be a project that the user is working on, such as an opportunity (e.g., a possible sale) with an existing partner, or a project that the user is trying to get. In one implementation of a multi-tenant database system, each record for the tenants has a unique identifier stored in a common table. A record has data fields that are defined by the structure of the object (e.g., fields of certain data types and purposes). A record can also have custom fields defined by a user. A field can be another record or include links thereto, thereby providing a parent-child relationship between the records.

In particular the relational database system 102 includes records that corresponds to feed items (feed items 104) and which may be part of one or more feeds. For example, if a user enters an information update to a feed of a group to which the user belongs, the information update is a feed item that can be viewed as part of a "wall" feed of the group, or as part of a "news" feed of a user that is following the group.

The non-relational database system 103 is used to store materialized feeds based on the state of the feed stored in the feed materialization state table 112. The non-relational database system 103 enables a fast and quick access to a feed from the materialized feeds tables 105 without going through the lengthy process of materializing the feed by executing a query on the relational database system 102. However, the non-relational database system 103 does not include the raw data (which is instead stored in the relational database system 102). Instead the data, here the materialized feeds table 105 result from the wrangling of the raw data, feed items 104, stored in the relational database to provide easy and quick access to the feeds when they are requested.

In some implementations, the non-relational database system 103 is an Hbase. Feeds are stored in the Hbase database based on an Hbase key including the type of the feed and one or more qualifiers that identify the feed. In an exemplary implementation, for example in a multi-tenant, multi-group environment, the key may include: a feed type, a container identifier, a tenant identifier, a tenant subgroup identifier, and a user identifier. The feed type indicates the type of the feed that is to be viewed or accessed, the tenant identifier identifies the tenant to which the feed belongs, the tenant subgroup identifier identifies a group within the tenant organization, the user identifier identifies the users that is viewing the feed, the container identifier identifies the record to which the feed belongs (e.g., the container ID can be a group ID, a user ID, etc.). In other implementations, the feed may be identified based on different number of parameters without departing from the scope of the present implementations.

Figure 2:
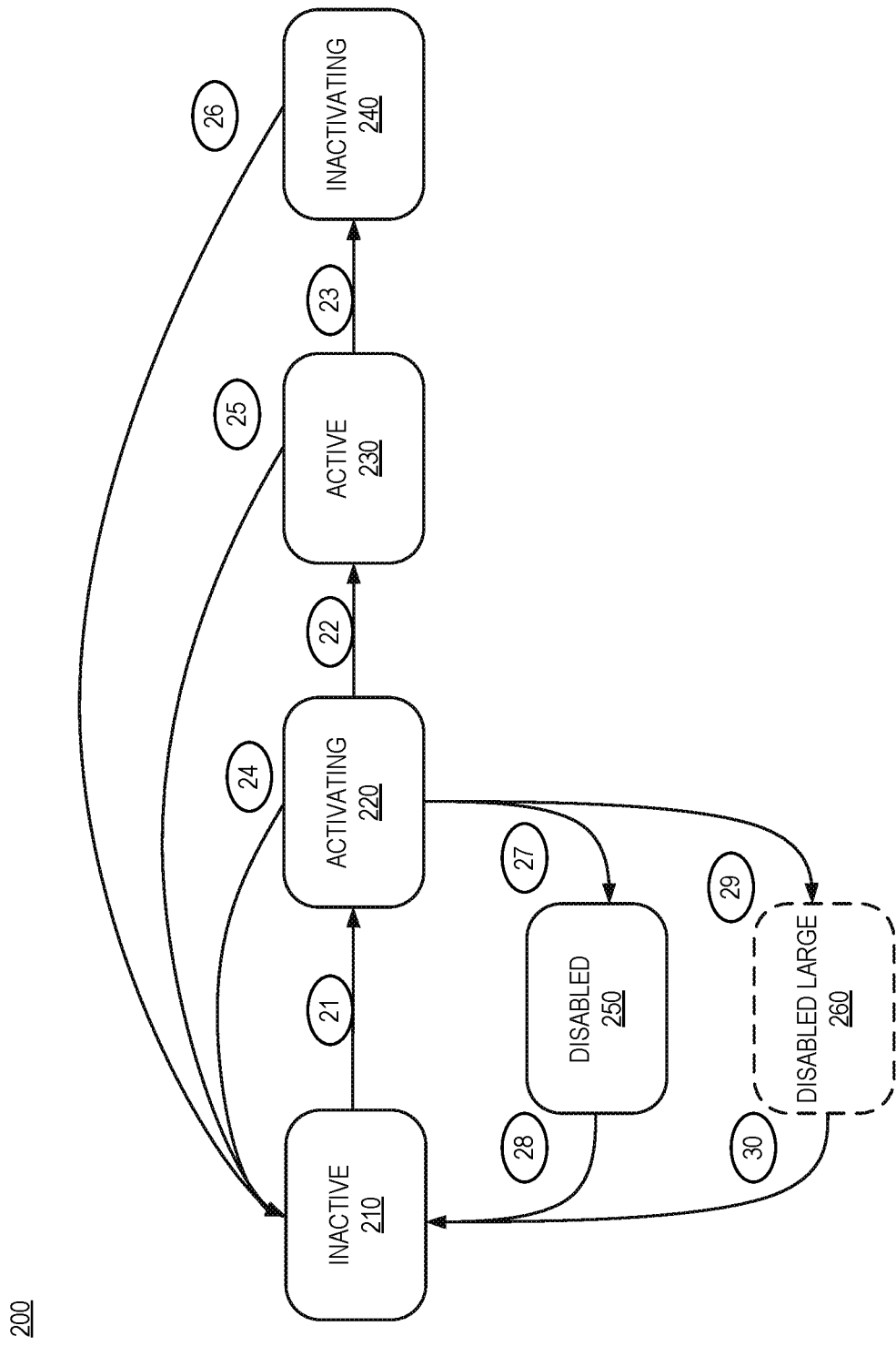
FIG. 2 illustrates a block diagram of an exemplary state machine for updating a state of a feed according to one implementation.

When a request is received (operation 1) at the feed manager 110, from a user through a client device 101A-N or from a feed processing unit 115, the feed composition unit 111 determines the state of the feed. For example, the request for the feed may be received when a user first logs in into his account and needs to view his news feed. The request for the feed is received at the feed composition unit 111. The feed composition unit 111 at operation 2, accesses the feed materialization state table 112 based on an identifier of the feed and retrieves the current state of the feed. The state of the feed can be at least any one of an active state, an inactive state, an activating state, an inactivating state, and a disabled state and may be determined based on a state machine as described in further details with respect to FIG. 2. FIG. 2 illustrates a block diagram of an exemplary state machine for updating a state of a feed according to one implementation.

In the following description, the operations of the feed manager 110 of FIG. 1B will be described with reference to the state machine 200 of FIG. 2 and the transitions of the state machine will be described with reference to the feed manager 110. However, the present implementations are not intended to be so limited. The state machine 200 can be used by other components than the feed manager 110 and the operations of the feed manager 110 can be performed with respect to another state machine without departing from the scope of the present implementations.

Based on the state of the feed, the feed composition unit 111 performs one of the two operations 3a or 3b, i.e., retrieving the feed from the relational database system 102 or alternatively retrieving the feed from the non-relational database system 103.

When the state of the feed is the inactive state, the feed composition unit 111 causes the request for the feed to be processed at the relational database system 102. The feed composition unit 111 transmits, at operation 3b, a request for the feed to the relational database system 102. The relational database system 102 runs the request and determines a query plan that will be executed by the database system to obtain the various feed items that form the feed. In addition, the feed composition unit 111 causes materialization of the feed by populating a materialized feeds table in the second non-relational database system 103 with feed items of the feed from the first relational database system 102. In one implementation, the feed composition unit 111 determines that the state of the feed is inactive, indicating that there is no materialized feed in the non-relational database system 103 that corresponds to this request, the feed composition unit 111 generates an asynchronous request to materialize the feed. This asynchronous request will be transmitted to the relational database system 102 for retrieving the feed items of the feed and storing a copy of them in the materialized feeds tables 105. The feed items stored in the non-relational database system 103 are identified and retrievable based on the identifier of the feed. In the third operations, the feed composition unit 111 sets the state of the feed to the activating state indicating that the feed is in the process of being activating. For example, the feed composition unit 111 may transmit an indication to the feed state manager 114 that the copy of the feed items for the feed has started and the feed state manager 114 transition the state of the feed from an inactive feed to the activating state in the feed materialization state table 112. Referring to FIG. 2, the transition 21 from the inactive state 210 to the activating state 220 occurs when the copy of the feed items is initiated.

Referring back to FIG. 1, when the state of the feed is the activating state, the feed composition unit 111 causes the request for the feed to be processed from the relational database system 102. In this case, while the feed is retrieved from the relational database system 102, there is no request sent to materialize the feed, as the activating state indicates that the materialization of the feed is already under way. In some implementations, the transition 22 between the activating state and the active state occurs once all of the feed items of the feed have been successfully copied to the non-relational database system 103. In other implementations, the transition 22 between the activating state and the active state may occur after a predetermined number of feed items from the feed have been successfully copied to the non-relational database system 103 and prior to the completion of the copy of all the feed items. In these implementations, when a successive request for the feed is received, the request is transmitted to the non-relational database system 103 significantly decreasing the response latency of the request when compared with a response obtained from the relational database system 102. This implementation is advantageous even if some of the feed items are still being copied to the non-relational database, as most users will likely not need to access all the feed items of the feed. For example, if a feed includes several thousands of feed items, and the state of the feed is transitioned to the active state after one thousand feed items are copied, a user may be interested in only viewing the thousand or less feed items and therefore the request from the user will be met quicker.

When the state of the feed is the activate state, the feed composition unit 111 causes the request for the feed to be processed from the non-relational database system 103. In this case, the feed is retrieved with a simple row look up from the materialized feeds table 105 of the feed based on the identifier of the feed. In some implementations the materialized feeds table 105 is a common table including feeds of users from multiple tenant. In other implementations, the non-relational database system 103 includes several materialized feed table 105, each materialized feed table being dedicated to a single tenant of the system.

When the state responsive to determining that the state of the feed is the inactivating state, the feed composition unit causes the request for the feed to be processed from the first relational database system 102.

When the state of the feed is the disabled state, the feed composition unit causes the request for the feed to be processed from the first relational database system 102 and the feed composition unit causes the update of the materialized feeds table in the second non-relational database system to be postponed for a predetermined amount of time. For example, the feed composition unit may reject any attempt to activate the materialization of the feed and thus the transition to the activating state for the predetermined period of time. This period of time can be any of several hours to several weeks and allows the social networking system 106 to guarantee reliable and accurate feed generation for the users by relying only on the raw data retrieved from the relational database system 102. In addition, the transition to the disabled state 250 causes the deletion of the feed from the materialized feeds table 105.

In some implementations, the system may include two types of disabled states: disabled and disabled large. The distinction between the two states reside in the length of the period of time that a feed is to remain in this state prior to transitioning to the inactive, in which materialization can be initiated. When the feed is in any one of these two states, a request for the feed is processed by transmitting the request to the first relational database system 102 instead of being transmitted to the non-relational database system 103. When the state of the feed is a "disabled large 260" state, the operations of the feed manager are similar to the operations performed with respect to the disabled state with the difference that the disabled state is associated with a first predetermined period of time and the disabled large is associated with a second predetermined period of time and the second predetermined period of time can be a longer period of time than the first predetermined period of time. For example, the second predetermined period of time for a disabled large state can vary from few weeks to few months prior to the state of the feed being transitioned to the inactive state and being reactivated and stored in the non-relational database system 103 as part of the materialized feeds tables 105. In one non-limiting example, when the two disabled states are used, the disabled state can be associated with a seven days period while the disabled large can be associated with a 1 month period. In these implementations, when the state of the feed is the disabled state or the disabled large state, the feed is retrieved from the relational database system 102 only and materialization of the feed is not performed until the respective period of time elapses.

Once the predetermined period amount of time has elapsed, the feed state manager 114 transitions, operation 28 or operation 30, the state of the feed from disabled or alternatively from disabled large to the inactive state 210. This enables the following requests received at the feed manager 110 for the feed to cause the materialization of the feed and to transition the state of the feed from inactive 210 to the activating state 220.

Referring back to FIG. 1B, the feed manager 110 includes a feed item update unit 113. The feed item update unit updates the relational database system 102 to and the non-relational database system 103 to include new feed items. When a new feed item is created, the feed item update unit adds the new feed item, operation 7b to the relational database system 102 (as part of the feed items 104). In some implementations, the new feed item can be associated with more than one feed. In these implementations, the feed item is added to the relational database system 102 in relationship with each one of the feeds that it is related to. Upon determining that a new feed item is to be added to the first relational database system, the feed item update unit 113 determines, operation 6, the state of the feed (or the states of the various feeds to which the feed item belongs). The feed item update unit 113 can use the identifier of the feed(s) to retrieve the corresponding feed state(s) from the feed materialization state table 112. Depending on the state of the feed, the feed item update unit 113 may update or not the materialized feeds table 105 to include the new feed item. When the feed item update unit 113 determines that the state of the feed is active or activating, it requests, operation 7a, to add the new feed item to the materialized feeds table 105 in the second non-relational database system 103 in association with the feed.

Error Handling:

The feed manager 110 allows for several mechanisms to handle errors that may occur during update of the feeds within the non-relational database system 103 and/or during read operations from the feeds in the non-relational database system 103. These error handling mechanisms ensure integrity of the data and enable users of the social networking system and/or applications to obtain accurate and up-to-date data when requesting a feed.

When the state of the feed is an active state and an error occurs when the feed composition unit 111 attempts to read from the non-relational database system 103 to retrieve the feed, the state of the feed is transitioned, operation 23, to the inactivating state 240, and the feed items stored in the materialized feeds table are deleted. The feed composition unit 111 falls back to the relational database system 102 to retrieve the feed. When the feed is completely deleted from the materialized feeds table 105, the state of the feed is transitioned, operation 26, from the inactivating state 240 to the inactive state 210.

When the state of the feed is the activating state and one or more errors occur when the feed composition unit 111 attempts to write to the non-relational database system 103 one or more feed items (e.g., upon performing the materialization or upon receipt of a new feed item), the state of the feed is transitioned, at operation 27, to the disabled state 250, and the feed items stored in the materialized feeds table are deleted. In this case, the feed composition unit 111 falls back to the relational database system 102 to retrieve the feed. The feed is then to remain in the disabled state 250 for a predetermined period of time until this period of time elapses where the state of the feed is transitioned to the inactive state 210. In some implementations, when the state of the feed is the activating state and one or more errors occur when the feed composition unit 111 attempts to write to the non-relational database system 103 one or more feed items (e.g., upon performing the materialization or upon receipt of a new feed item), the state of the feed is transitioned, at operation 29, to the disabled large state 260, and the feed items stored in the materialized feeds table are deleted. In this case, the feed composition unit 111 falls back to the relational database system 102 to retrieve the feed. In some implementations, the feed transitions to the disabled large state 260 or alternatively to the disabled state 250 depending on the type and/or number of errors that occur during the write process. For example, in some implementations when the error occurs during the materialization of the feed, the state is transitioned to the disabled large 260; while when the error occurs during the write of a new feed item the state is transitioned to the disabled state 250.

When the state of the feed is the active state 230 and one or more errors occur when the feed composition unit 111 attempts to write to the non-relational database system 103 one or more feed items during a database maintenance operation, the state of the feed is transitioned to the inactive state 240, and the feed items stored in the materialized feeds table are deleted.

In some implementations, the materialized feeds can be reset in order to ensure integrity of the data stored in the materialized feeds table 105. For example, the feed state manager 114 upon determining that a feed has been in the active state 230 for a predetermined period of time, transition the state of the feed to the inactive state 210, and causes the deletion of the feed from the second non-relational database system 103. This causes a next request for the feed to be processed from the first relational database system 102 and to initiate materialization of the feed consequently ensuring that the data returned for the request is accurate and up to date.

The operations of the flow diagrams of FIGS. 3-10 will be described with reference to the exemplary implementations of the block diagrams of FIGS. 1A-2. However, the operations of the flow diagrams can be performed by implementations other than those discussed with reference to the other figures, and the implementations discussed with reference to these other figures can perform operations different than those discussed with reference to the flow diagrams. The operations of the flow diagram of FIGS. 3-10 will be described with reference to the feed manager 110. However, in some implementations, different operations can be performed by different components within or outside of the feed manager 110 without departing from the scope of the implementations described herein. For example, some operations can be performed by the feed composition unit 111 when other operations are performed by the feed state manager 114 or the feed item update unit 113. In other implementations some operations can be performed by components of the social networking system that are coupled with the feed manager 110.

Figure 3:
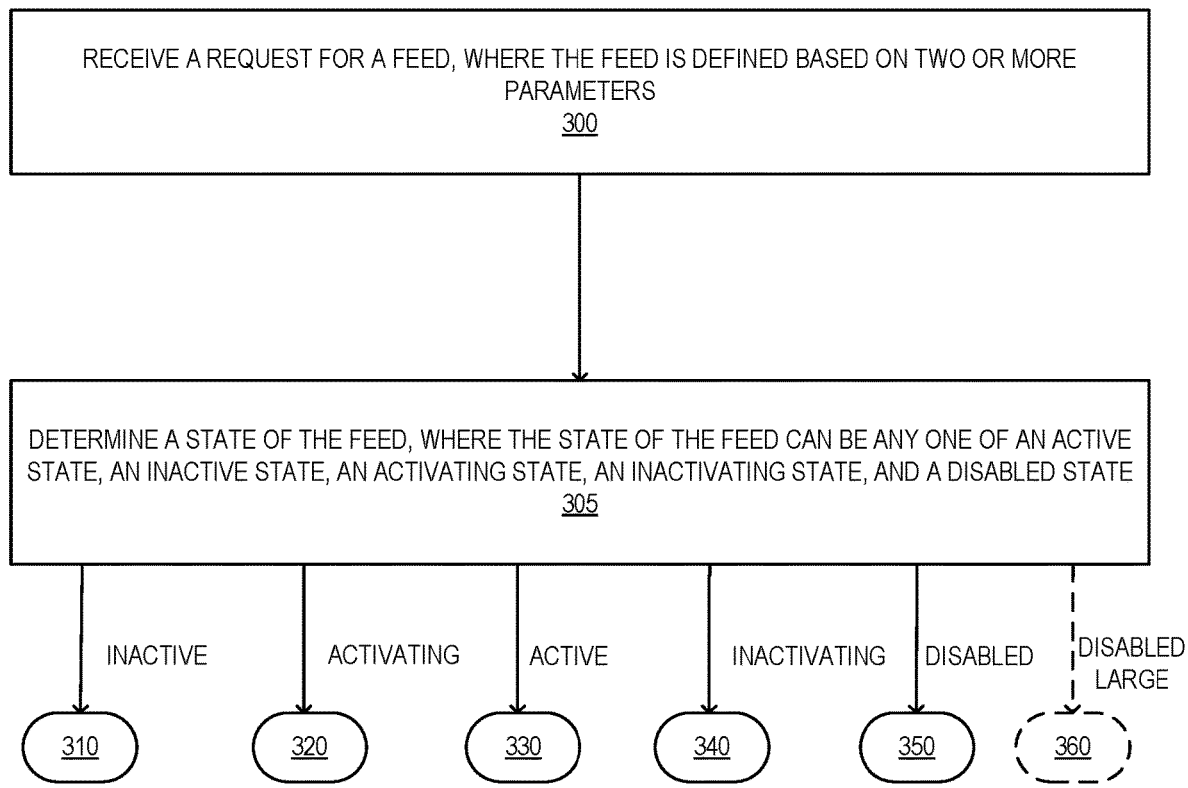
FIG. 3 illustrates a flow diagram of exemplary operations for enabling a dynamic materialization of feeds in a social networking system according to some implementations.

FIG. 3 illustrates a flow diagram of exemplary operations for enabling a dynamic materialization of feeds in a social networking system according to some implementations. At operation 300, the feed manager 110 receives a request for a feed, where the feed is defined based on two or more parameters. In some implementations, the parameters include at least two of a feed type, a container identifier, a tenant identifier, a tenant subgroup identifier, and a user identifier. The feed type indicates the type of the feed that is to be viewed or accessed, the tenant identifier identifies the tenant to which the feed belongs, the tenant subgroup identifier identifies a group within the tenant organization, the user identifier identifies the users that is viewing the feed, the container identifier identifies the record to which the feed belongs (e.g., the container ID can be a group ID, a user ID, etc.). In other implementations, the feed may be identified based on different number of parameters without departing from the scope of the present implementations. The request may be received from a user through a client device 101A-N or from a feed processing unit 115.

Flow then moves to operation 305, at which the feed manager 110 determines a state of the feed. The state of the feed can be at least any one of an active state, an inactive state, an activating state, an inactivating state, and a disabled state.

Responsive to determining that the state of the feed is the inactive state, the flow moves to operations 310. Responsive to determining that the state of the feed is the activating state, the flow moves to operations 320. Responsive to determining that the state of the feed is the active state, the flow moves to operations 330. Responsive to determining that the state of the feed is the activating state, the flow moves to operations 340. Responsive to determining that the state of the feed is the disabled state, the flow moves to operations 350. In some implementations, responsive to determining that the state of the feed is the disabled large, the flow moves to operations 360.

Figure 4:
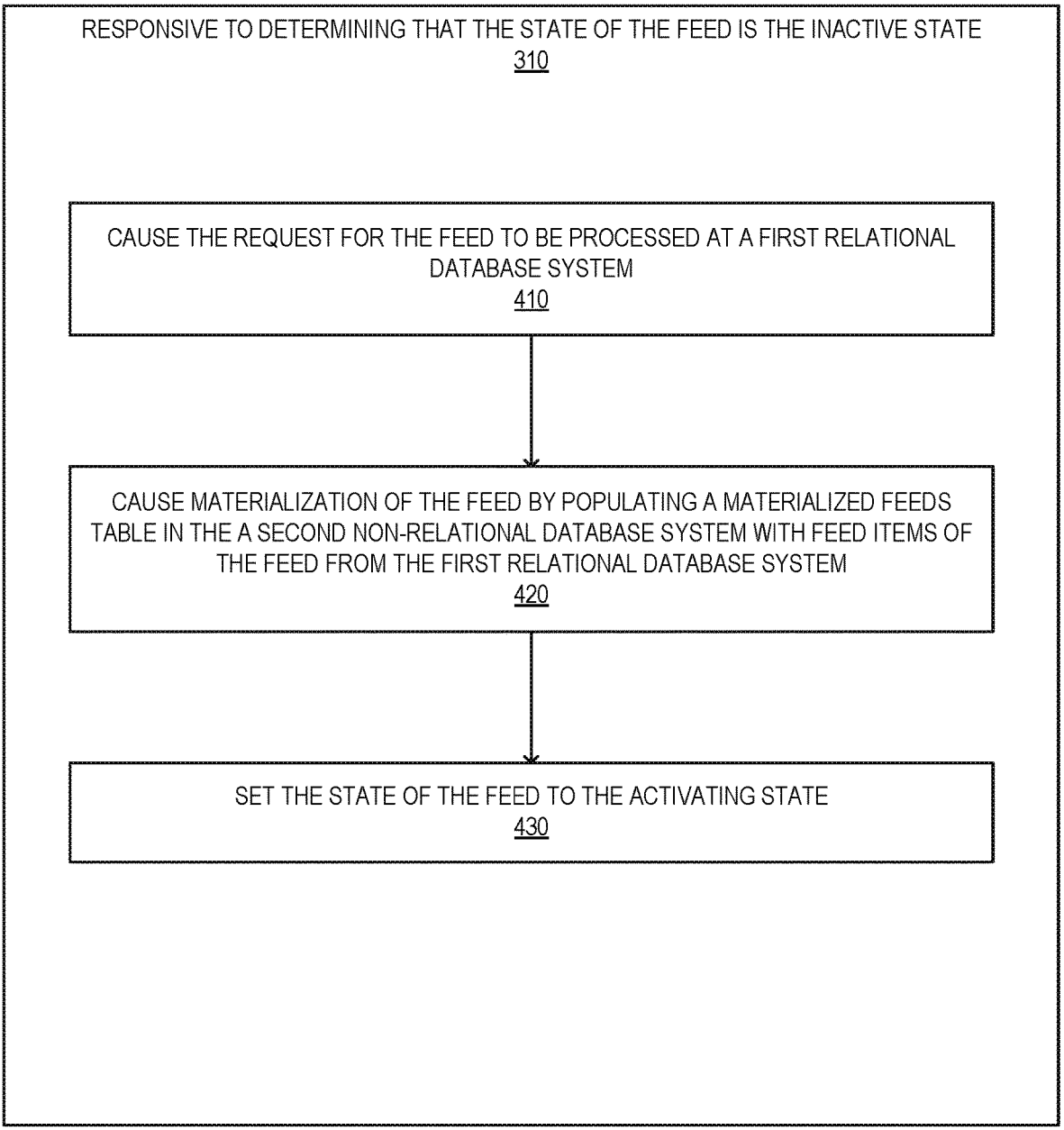
FIG. 4 illustrates a flow diagram of exemplary operations 310 performed when the state of the feed is in the inactive state according to some implementations.

FIG. 4 illustrates a flow diagram of exemplary operations 310 performed when the state of the feed is in the inactive state, according to some implementations. At operation 410, the feed manager 110 causes the request for the feed to be processed at a first relational database system. At operation 420, the feed manager 110 causes materialization of the feed by populating a materialized feeds table in the second non-relational database system 103 with feed items of the feed from the first relational database system 102. At operation 430, the feed manager 110 sets the state of the feed to the activating state.

Figure 5:
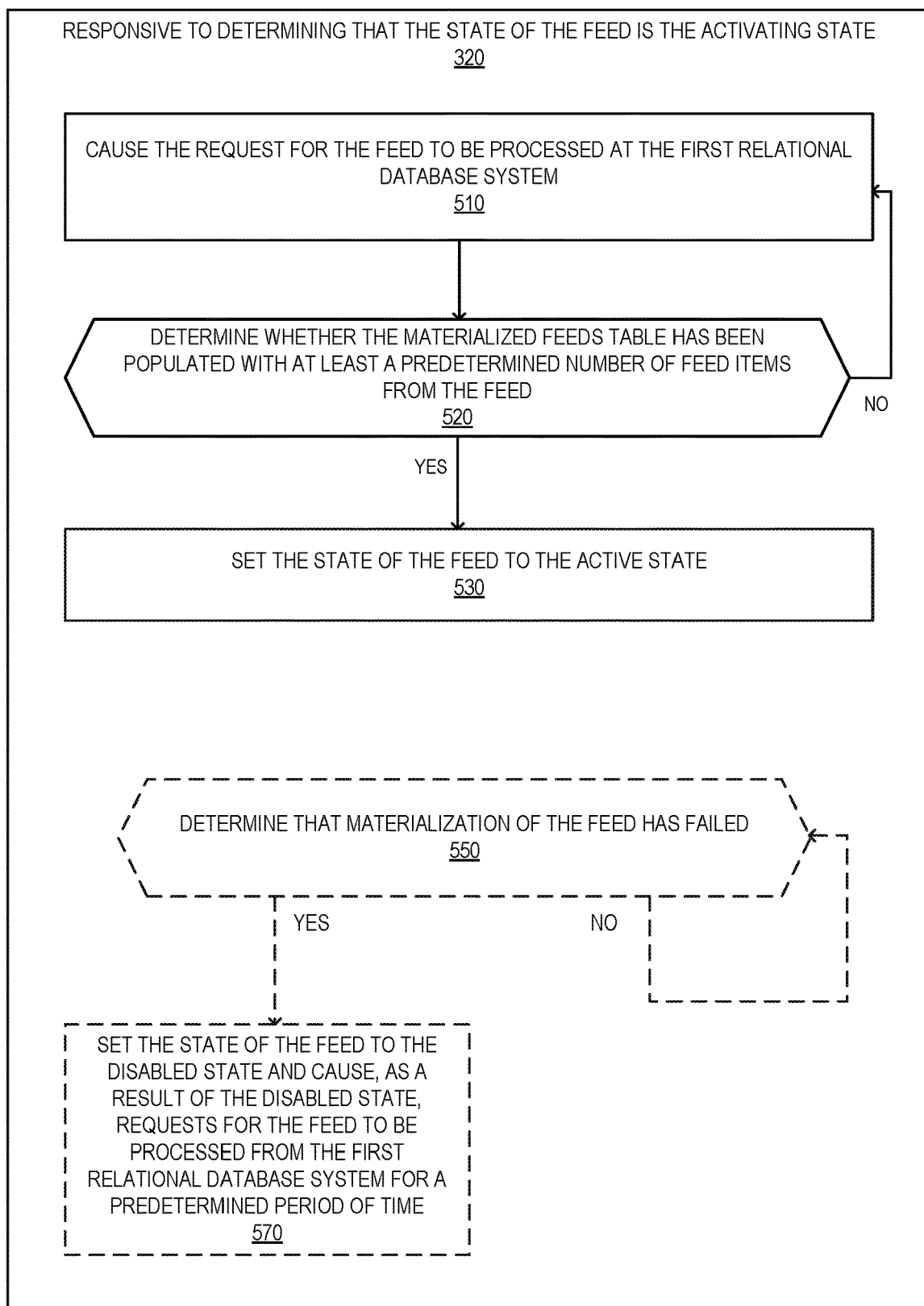
FIG. 5 illustrates a flow diagram of exemplary operations performed when the state of the feed is in the activating state, according to some implementations.

FIG. 5 illustrates a flow diagram of exemplary operations 320 performed when the state of the feed is in the activating state, according to some implementations. When a request is received at the feed manager 110 and the feed is in the activating state, at operation 510, the feed manager 110 causes the request for the feed to be processed from the materialized feeds table in the second non-relational database system 103. This enables the request to be efficiently and quickly processed by a retrieval of the feed items with a reading operations of rows from the non-relational database system 103 without going through a length process of executing a request in the relational database system 102. In contrast to a read from the non-relational database system 103, the execution of a request in the relational database system 102, includes determining the various feed items that may be included in the feed and generating a detailed query plan that is used to retrieve these feed items from various locations within the relational database system 102. Flow then moves to operation 520, at which the feed manager determines whether the materialized feeds table has been populated with at least a predetermined number of feed items from the feed. When the materialized feeds table has been populated with at least a predetermined number of feed items from the feed, the flow moves to operation 530, at which the feed manager 110 sets the state of the feed to the active state causing a next request for the feed to be processed from the second relational database system regardless of whether the copy of the feed to the second relational database system has been completed. Alternatively when the materialized feeds table has not yet been populated with at least the predetermined number of feed items from the feed, the flow moves to operation 510, at which the feed manager 110 continues to populate the materialized feeds table without changing the state of the feed. In this case the state of the feed remains in the activating state such that a next request for the feed is to be processed from the first relational database system. In some implementations, the predetermined number of feed items may be less than all of the feed items of the feed. In these implementations, the feed manager 110 may process requests for the feed from the second non-relational database even if not all of the feed items of the feed have been copied to this database. In other implementations, the predetermined number of feed items is all the feed items of the feed, and the feed manager processes a request for the feed from the second non-relational database system 103 only when all of the feed items of the feed have been stored in this database.

In some implementations, the feed manager 110 enables an error handling mechanism when the state of a feed is in the activating state. Operations 550-570 are exemplary operations for performing an error handling mechanism when the state of the feed is in the activating state. At operation 550, the feed manager 110 determines whether materialization of the feed has failed. When the feed manager 110 determines that materialization of the feed has failed, the flow moves to operation 570, at which the feed manager 110 sets the state of the feed to the disabled state, and causes, as a result of the disabled state, requests for the feed to be processed from the first relational database system 102 for a predetermined period of time.

Figure 6:
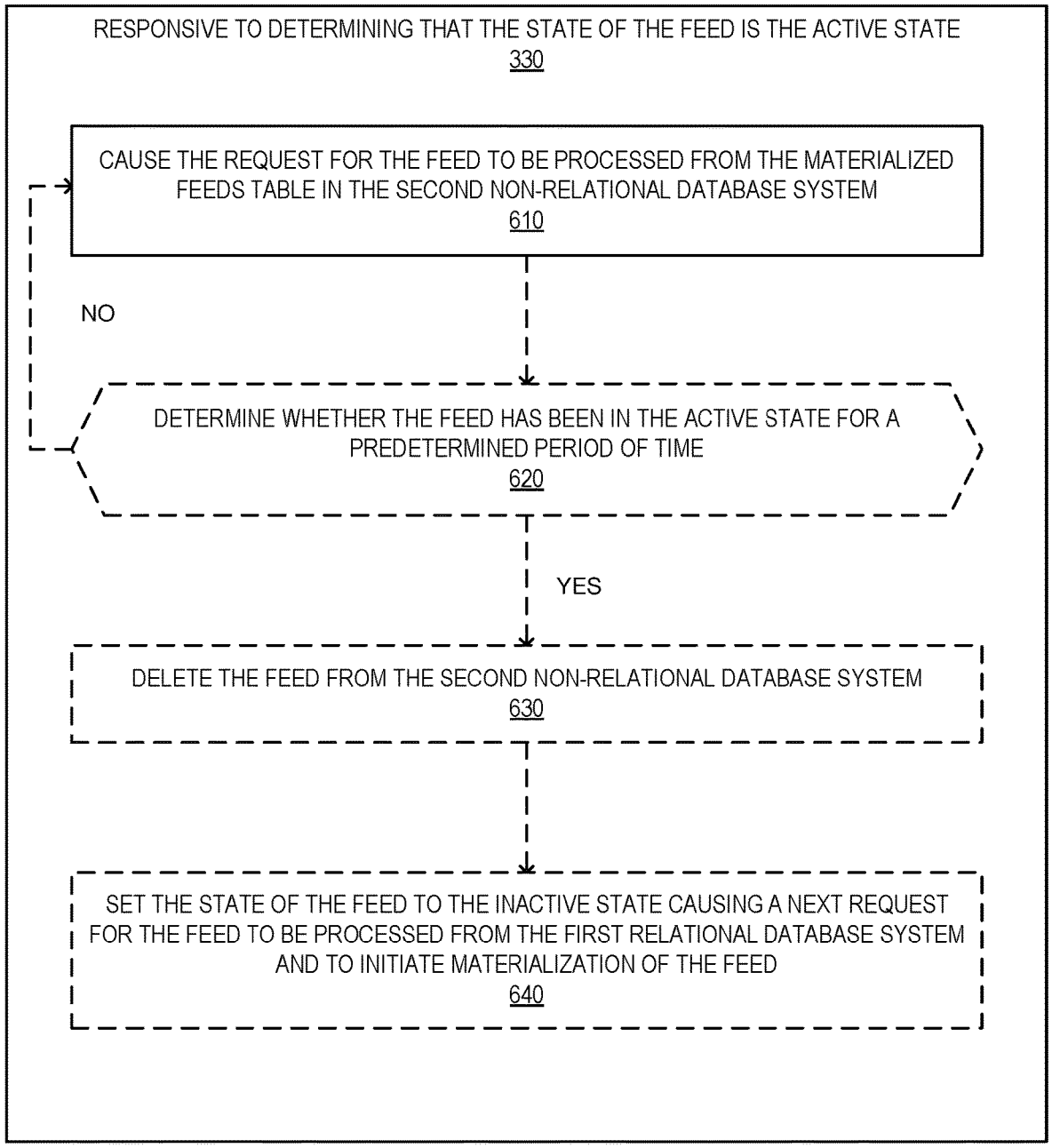
FIG. 6 illustrates a flow diagram of exemplary operations performed when the state of the feed is in the active state, according to some implementations.

FIG. 6 illustrates a flow diagram of exemplary operations 330 performed when the state of the feed is in the active state, according to some implementations. Responsive to determining that the state of the feed is the active state, the feed manager 110 causes, operation 610, the request for the feed to be processed from the materialized feeds table in the second non-relational database system 103.

In some implementations, the feed manager 110 enables a database maintenance mechanism when the state of a feed is in the active state. Operations 620-640 are exemplary operations for performing an error handling mechanism when the state of the feed is in the activate state. At operation 620, the feed manager 110 determines whether the feed has been in the active state for a predetermined period of time, performing operations 630 and 640. At operation 630, the feed manager 110 causes deletion of the feed from the second non-relational database system 103, and at operation 640, the feed manager 110 sets the state of the feed to the inactive state causing a next request for the feed to be processed from the first relational database system and to initiate materialization of the feed.

Figure 7:
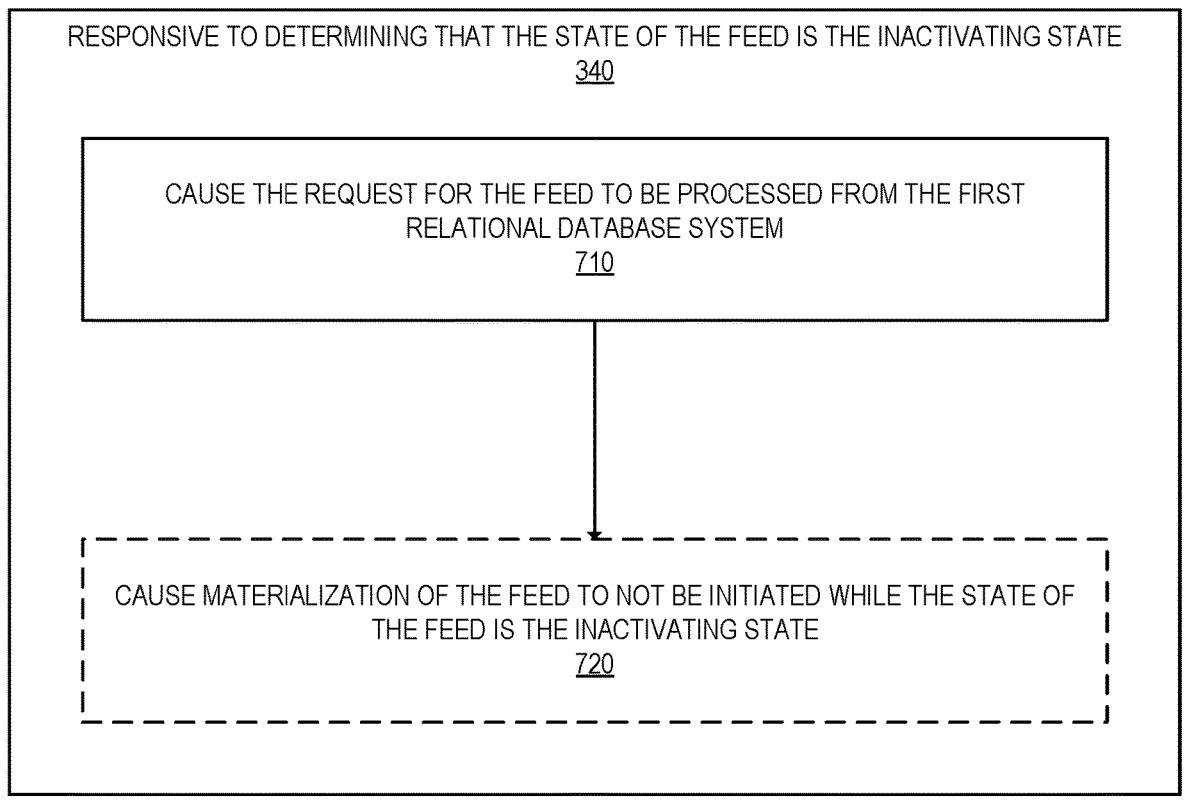
FIG. 7 illustrates a flow diagram of exemplary operations performed when the state of the feed is in the inactivating state, according to some implementations.

FIG. 7 illustrates a flow diagram of exemplary operations 340 performed when the state of the feed is in the inactivating state, according to some implementations. Responsive to determining that the state of the feed is the inactivating state, the feed manager 110 causes, at operation 710, the request for the feed to be processed from the first relational database system 102. At operation 720, the feed manager 110 causes the materialization of the feed to not be initiated while the state of the feed is in the inactivating state.

Figure 8:
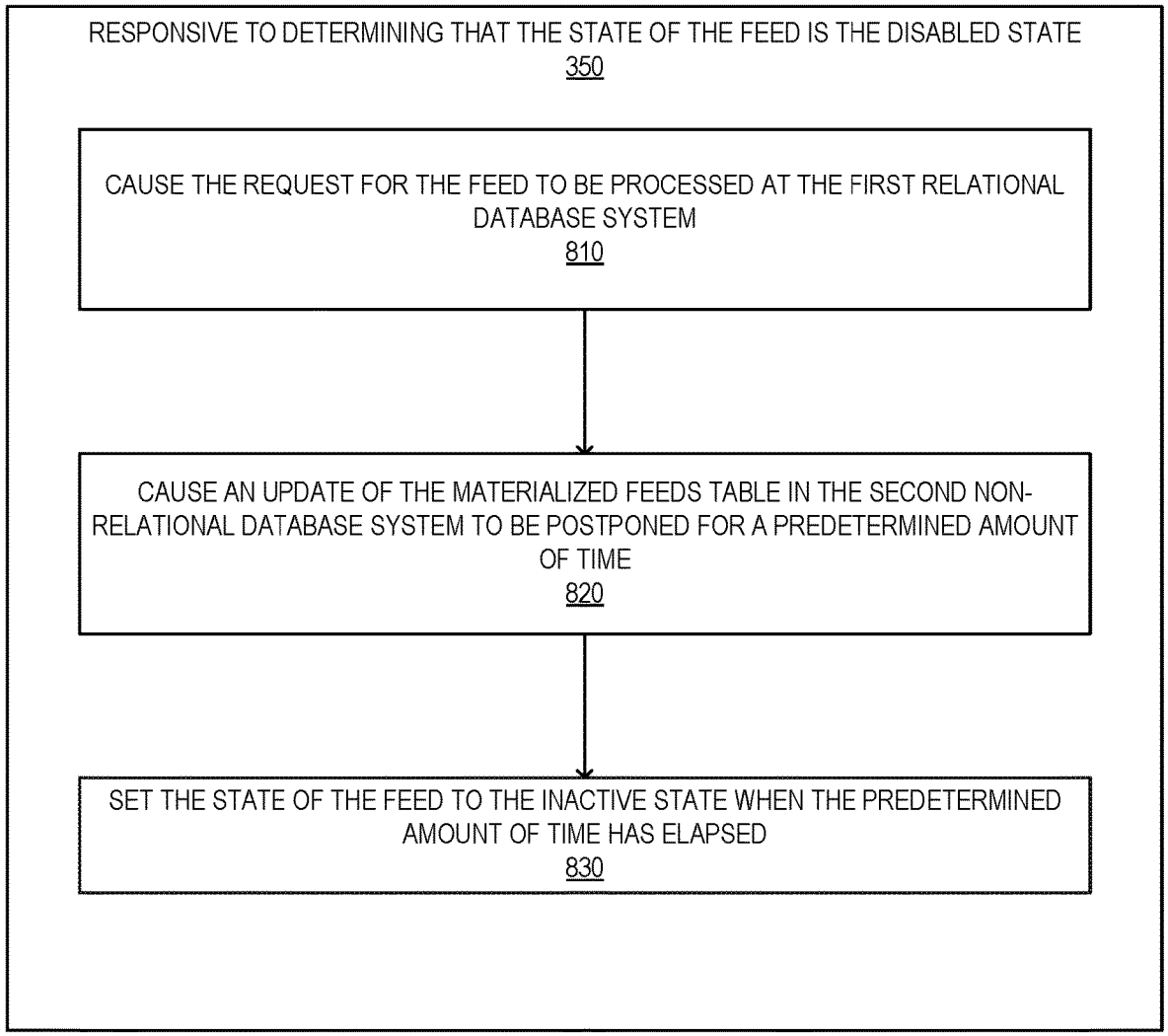
FIG. 8 illustrates a flow diagram of exemplary operations 350 performed when the state of the feed is in the disabled state, according to some implementations.

FIG. 8 illustrates a flow diagram of exemplary operations 350 performed when the state of the feed is in the disabled state, according to some implementations. Responsive to determining that the state of the feed is the disabled state, operations 810-830 are performed. At operation 810, the feed manager 110 causes the request for the feed to be processed from the first relational database system 102. At operation 820, the feed manager causes an update of the materialized feeds table in the second non-relational database system 103 to be postponed for a predetermined amount of time. At operation 830, the state of the feed is set to the inactive state when the predetermined amount of time has elapsed.

Figure 9:
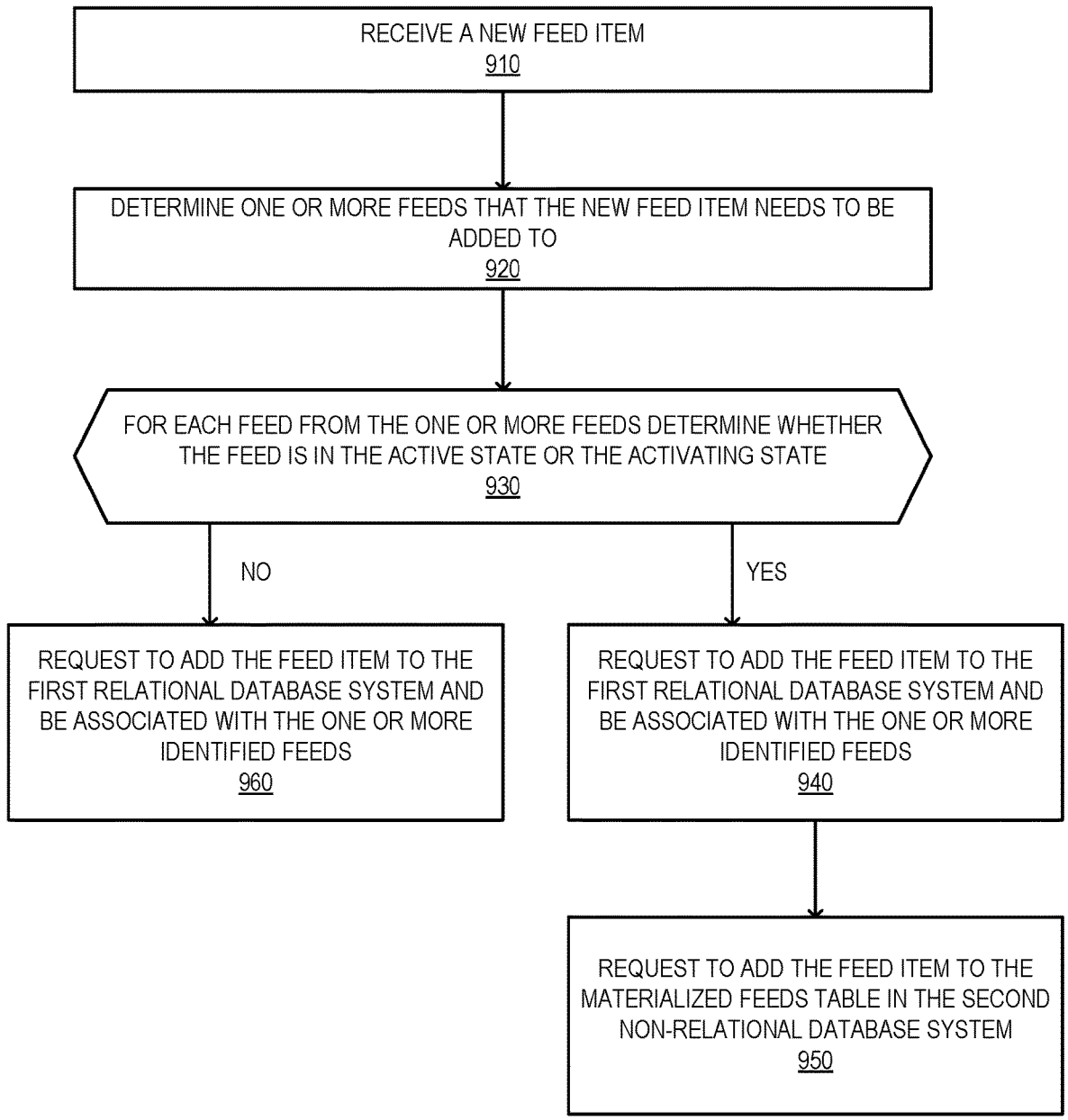
FIG. 9 illustrates a flow diagram of exemplary operations performed when a new feed item is received in the social networking system, in accordance with some implementations.

FIG. 9 illustrates a flow diagram of exemplary operations performed when a new feed item is received in the social networking system, in accordance with some implementations. At operation 910 a new feed item is received at the feed manager 110. At operation 920, the feed manager 110 determines one or more feeds that the new feed item needs to be added to. At operations 930, for each feed from the feeds, the feed manager 110 determines whether the feed is in the active state or in the activating state. When it is determined that the fee is in the active or activating states, the flow moves to operations 940 and 950. At operation 940, the feed manager requests to add the feed item to the first relational database system and be associated with the feeds that were identified. In addition, the feed manager requests, at operation 950, to add the feed item to the materialized feeds table(s) in the second non-relational database system. Alternatively, when it is determined that the fee is neither in the active nor in the activating states, the flow moves to operation 960. The feed manager requests to add the feed item to the first relational database system 102 and be associated with the feeds that were identified without requesting to add this new feed item to the second non-relational database system 103 as there is no materialized (or materializing) feed associated with this feed item in this database.

Figure 10:
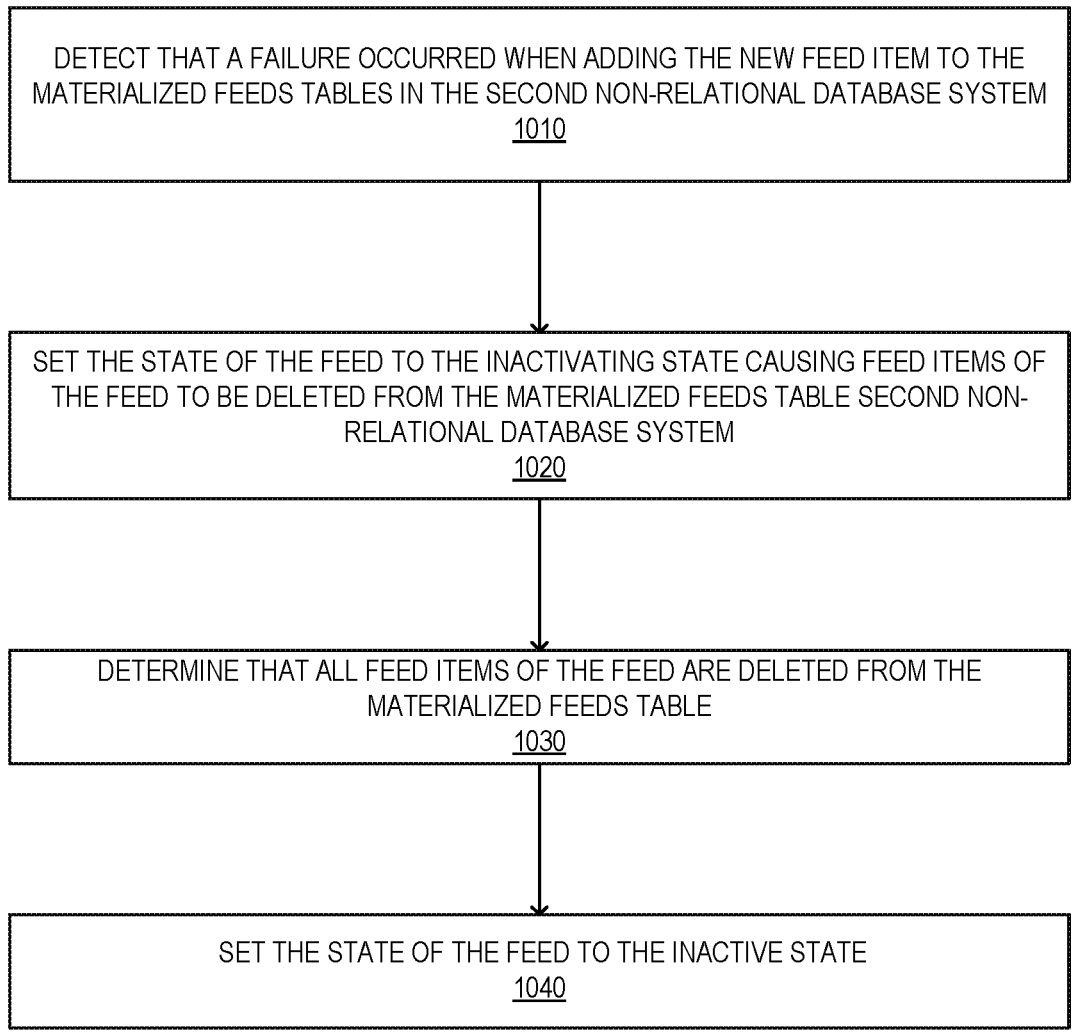
FIG. 10 illustrates a flow diagram of exemplary operations performed when an error occurs during the process of adding a new feed item to a materialized feed, in accordance with some implementations.

FIG. 10 illustrates a flow diagram of exemplary operations performed when an error occurs during the process of adding a new feed item to a materialized feed, in accordance with some implementations. Responsive to detecting that a failure occurred when adding the new feed item to the materialized feeds table in the second non-relational database system, setting the state of the feed to the inactivating state causing feed items of the feed to be deleted from the materialized feeds table in the second non-relational database system. At operation 1030, the feed manager 110 determines that all feed items of the feed are deleted the materialized feeds table, setting the state of the feed to the inactive state.

The implementation presented herein provide several advantages when compared with existing solutions of feed materialization. The mechanisms enable to reduce computational demands on the social networking system and the database storing the feed items when comes time to read the feed by enabling materialization of feeds that were recently requested. In addition, the use of a separate data structure (a non-relational database system) to store the materialized feeds ensures that the integrity of the raw data is always maintained as the materialized feeds are not the data itself. The materialized feeds are the end result of munging data and not the data itself that is stored in the relational database system. Processes and users can access the materialized feeds from the second non-relational database with a quick and efficient look up after determining that the state of the feed is active. Processes and users need to retrieve the data from the relational database when the state of the feed is in any other state ensuring that accurate and updated data is provided to the processes and the users at all time.

Architecture:

One or more parts of the above implementations may include software and/or a combination of software and hardware. An electronic device stores and transmits (internally and/or with other electronic devices over a network) code (which is composed of software instructions and which is sometimes referred to as computer program code or a computer program) and/or data using machine-readable media (also called computer-readable media), such as machine-readable storage media (e.g., magnetic disks, optical disks, read only memory (ROM), Flash memory, phase change memory, solid state drives (SSDs)) and machine-readable transmission media (also called a carrier) (e.g., electrical, optical, radio, acoustical or other form of propagated signals—such as carrier waves, infrared signals). Thus, an electronic device (e.g., a computer) includes hardware and software, such as a set of one or more processors coupled to one or more machine-readable storage media to store code for execution on the set of processors and/or to store data. For instance, an electronic device may include non-volatile memory (with slower read/write times, e.g., magnetic disks, optical disks, read only memory (ROM), Flash memory, phase change memory, SSDs) and volatile memory (e.g., dynamic random access memory (DRAM), static random access memory (SRAM)), where the non-volatile memory persists the code/data even when the electronic device is turned off (when power is removed), and the electronic device copies that part of the code that is to be executed by the processor(s) of that electronic device from the non-volatile memory into the volatile memory of that electronic device during operation because volatile memory typically has faster read/write times. As another example, an electronic device may include a non-volatile memory (e.g., phase change memory) to store the code/data when the electronic device is turned off, and that same non-volatile memory has sufficiently fast read/write times such that, rather than copying the part of the code to be executed into volatile memory, the code/data may be provided directly to the processor(s) (e.g., loaded into a cache of the processor(s)); in other words, this non-volatile memory operates as both long term storage and main memory, and thus the electronic device may have no or only a small amount of DRAM for main memory. Typical electronic devices also include a set of one or more physical network interface(s) to establish network connections (to transmit and/or receive code and/or data using propagating signals) with other electronic devices.

Figure 11:
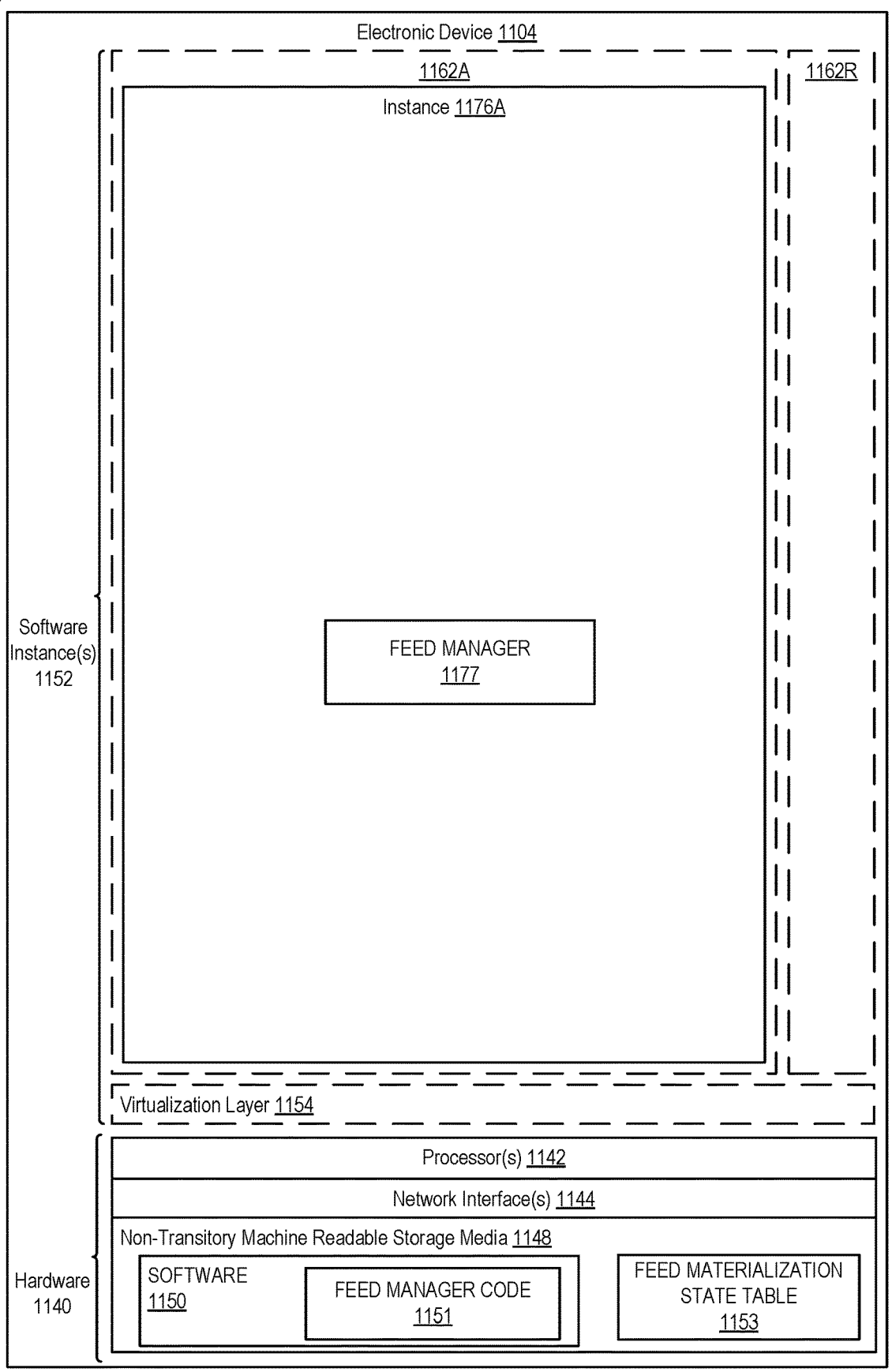
FIG. 11 illustrates an electronic device according to one implementation.

FIG. 11 illustrates an electronic device 1104 according to one implementation. FIG. 11 includes hardware 1140 comprising a set of one or more processor(s) 1142, a set or one or more network interfaces 1144 (wireless and/or wired), and non-transitory machine-readable storage media 1148 having stored therein software 1150. The software includes feed manager code 1151, which when executed by one or more processors 1142 causes the network device to perform the operations described above with reference to FIGS. 1A-10. The non-transitory machine-readable storage media 1148 may store a feed materialization state table 1153. Each of the previously described systems, the social networking system 106, the client devices, the relational database system 102 and the non-relational database system 103 may be implemented in one or more electronic devices 1104. In one implementation, each of these devices is implemented in a separate one of the electronic devices 1104 (e.g., in an end user electronic device operated by an end user; in which case, the software 1150 in each such end user electronic device includes the software to implement one of the end user clients, including one of the database driver(s) 1204 and/or software to interface with a the social networking system 106 (e.g., an API, a web browser, a native client, a portal, a command-line interface, etc.)) and the social networking system 106 is implemented in a separate set of one or more of the electronic devices 1104; in operation, the end user electronic devices and the electronic device(s) implementing the social networking system 106 would be commutatively coupled (e.g., by a network) and would establish between them (or through one or more other layers (e.g., non-relational database system 103, which may be implemented in a set of one or more electronic devices that is separate from, overlapping with, or the same as the set of one or more electronic devices on which the social networking system 106 is implemented)) connections for submitting requests to the relational database system 102 or the non-relational database system 103 and returning feed items of a feed. Other configurations of electronic devices may be used in other implementations (e.g., an implementation in which the end user clients, the social networking system 106, and the relational database system 102 and the non-relational database system 103 are implemented on a single electronic device).

In electronic devices that use compute virtualization, the processor(s) 1142 typically execute software to instantiate a virtualization layer 1154 and software container(s) 1162A-R (e.g., with operating system-level virtualization, the virtualization layer 1154 represents the kernel of an operating system (or a shim executing on a base operating system) that allows for the creation of multiple software containers 1162A-R (representing separate user space instances and also called virtualization engines, virtual private servers, or jails) that may each be used to execute a set of one or more applications; with full virtualization, the virtualization layer 1154 represents a hypervisor (sometimes referred to as a virtual machine monitor (VMM)) or a hypervisor executing on top of a host operating system, and the software containers 1162A-R each represent a tightly isolated form of software container called a virtual machine that is run by the hypervisor and may include a guest operating system; with para-virtualization, an operating system or application running with a virtual machine may be aware of the presence of virtualization for optimization purposes). Again, in electronic devices where compute virtualization is used, during operation an instance of the software 1150 (illustrated as instance 1176A) is executed within the software container 1162A on the virtualization layer 1154. In electronic devices where compute virtualization is not used, the instance 1176A on top of a host operating system is executed on the "bare metal" electronic device 1104. The instantiation of the instance 1176A, as well as the virtualization layer 1154 and software containers 1162A-R if implemented, are collectively referred to as software instance(s) 1152.

Alternative implementations of an electronic device may have numerous variations from that described above. For example, customized hardware and/or accelerators might also be used in an electronic device.

Figure 12:
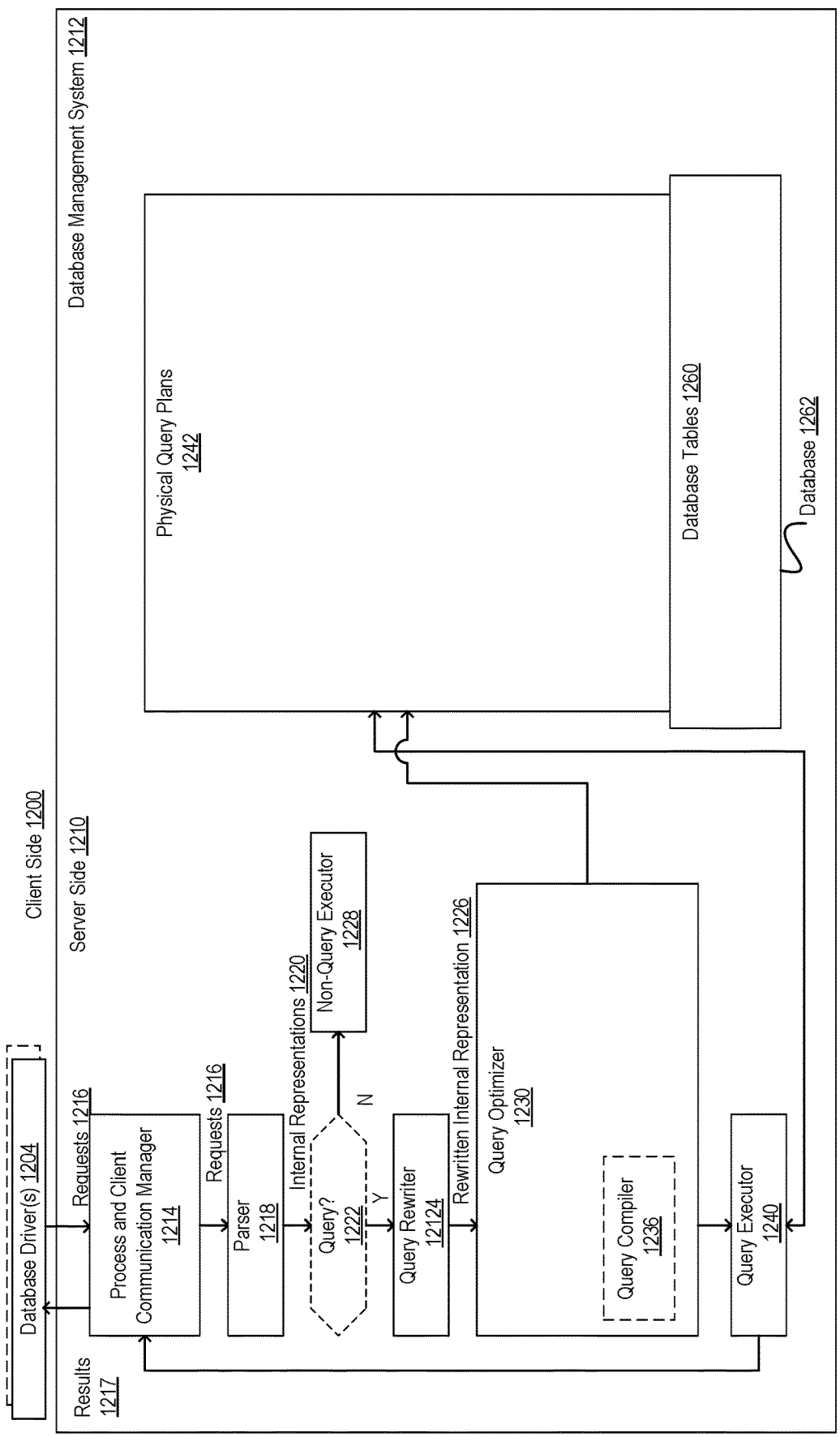
FIG. 12 is a block diagram illustrating a data base management system according to one implementation.

FIG. 12 is a block diagram illustrating a data base management system according to one implementation. FIG. 12 divides into a client side 1200 and a server side 1210. The client side 1200 includes one or more clients (not shown), each including one of the database driver(s) 1204 (also known as a remote procedure call (RPC) module) as well as other components known in the art (not shown). In some implementations the client side 1200 may include a feed manager 110 of the social networking system 106. In some implementations, the relational database system 102 is implemented according to the components of the database management system 1212 described herein.

The server side 1210 includes the database management system (DBMS) 1212. The DBMS 1212 includes a database in which clients store, and from which clients retrieve, data. The DBMS 1212 includes components named according to the components commonly found in DBMSs (e.g., Joseph M. Hellerstein, Michael Stonebraker, and James Hamilton, "Architecture of a Database," Foundations and Trends in Databases, Vol. 1, No. 2 (2007), pages 141-259; Joseph M. Hellerstein and Michael Stonebraker, "Anatomy of a Database," Readings in Database Systems, Fourth Edition, The MIT Press (2005), pages 42-95), such as a process and client communication manager (PCCM) 1214, a parser 1218, a query rewriter 1224, a query optimizer 1230 and a query executor 1240 (also known as an executor or query plan executor). The term "query processor" refers to the combination of the parser 1218, the query rewriter 1224, the query optimizer 1230 and the query executor 1240.

The process and client communication manager 1214 (which, in some implementations is made as separate managers; and is also sometimes referred to as just the process manager) may perform a variety of tasks, including: 1) establishing and storing the connection state for the client(s), responding to client requests in the form of requests 1216, and returning results 1217; and/or 2) encapsulating and scheduling the various tasks of the DBMS 1212 (including performing admission control). Connections are established between the database driver(s) 204 of the client(s) and the process and client communication manager 1214. The database driver(s) 1204 submit the requests 1216 to the PCCM 1214.

The PCCM 1214 provides the requests 1216 to the parser 1218. In one implementation, the tasks of the parser 1218 include converting the requests 1216 into internal representations 1220 (e.g., abstract syntax trees (ASTs)). A decision block 1222 illustrates distinguishing those of the requests 216 that are SQL queries from those that are not. Decision block 1222 is dashed because this decision can be made at one or more different locations in the DBMS 1212 (e.g., at its illustrated location, and/or between the query optimizer 1230 and the query executor 1240, and/or as part of the query executor 1240). At the illustrated location, those of the internal representations 1220 that were generated from the requests 1216 that are SQL queries go to the query rewriter 1224, while those that are not go to a non-query executor 1228.

The query rewriter 1224 simplifies and normalizes the internal representations 1220 of the SQL queries to produce rewritten internal representations 1226 (e.g., rewritten ASTs representing the structure and contents of the query strings) that are provided to the query optimizer 1230. While the query rewriter 1224 is illustrated as a separate component, in some implementations it is part of the parser 1218 or the query optimizer 1230 as in some commercial DBMSs.

The query optimizer 1230 generates query plans (which may include performing query plan optimization) from the rewritten internal representations 1226. In some implementations, for each of the rewritten internal representations 1226, the query optimizer 1230 first creates a "logical query plan" (further described later herein) prior to creating a "physical query plan" (also known as "fully specified query plan") in physical query plans 1242. Different implementations may generate logical query plan in different ways, including those that are well known in the art (e.g., Van den Bussche, J., Vansummeren, S., Translating SQL into the Relational Algebra, available at https://cs.ulb.ac.be/public/_media/teaching/infoh417/sql2alg_eng.pdf, retrieved October 2016; Kifer, M. et al, Database Systems: Application Oriented Approach, Complete Version—2nd edition, ISBN-13: 978-0321268457, Mar. 26, 2005). For example, in one implementation a logical query plan is created from a rewritten internal representation by walking the AST and creating nodes from the AST which correspond to query plan operators (e.g., PROJECT for a "select" statement, JOIN or SELECT for a "where" clause, etc.).

The query executor 1240 executes the physical query plans 1242 corresponding to the SQL queries, which includes accessing the specified data from the specified database tables in the database 1262, performing the query plan operations specified by those physical query plans, and providing the results to the process and client communication manager 1214; which in turn provides those results (shown as results 1217) to the respective ones of the clients that submitted the respective SQL queries.

Each of the physical query plans 1242 comprises a directed graph of nodes connected by edges, wherein each of the directed graphs represents an ordered set of query plan operators that when executed provides the query result for an SQL query.

In one implementation, the query optimizer 1230 includes a query compiler 1236 that compiles the query plan into machine code or an interpretable query plan (to enable cross platform portability and which may be lightweight (e.g., an annotated relational algebra expression) or in a lower level language (e.g., Java byte codes)).

Each of the nodes of the directed graphs in the physical query plans 1242 represents one of the query plan operators of the physical query plans 1242. The nodes of the physical query plans 1242 may be referred to as "nodes" or "physical query plan nodes" (PQPNs).

The non-query executor 1228 may execute an INSERT operation (i.e., insert one or more data records in a table of the database), UPDATE operation (i.e., change the contents of one or more data records in tables of the database), DELETE operation (i.e., delete one or more data records in one or more tables of the database), and optionally other operations that modify the contents of a table; as well as executes at least CREATE TABLE, and optionally other Data Definition Language (DDL) operations that don't change the content of tables, but the tables themselves (e.g., the schema).

In one implementation, operation of the DBMS 1212 begins with no query plans (logical or physical). Responsive to one or more CREATE TABLE statements in requests 1216, the DBMS 1212 creates a table. Responsive to a first SQL query being received, the DBMS 1212 generates and executes a first physical query plan, and returns a query result to the client that submitted the first SQL query.

The arrowed lines between the PCCM 1214, parser 1218, query rewriter 1224, query optimizer 1230, query executor 1240, and non-query executor 1228 in FIG. 12 represent some type of coupling, such as data flow and/or connectivity. For instance, in some implementations the PCCM 1214 calls each of the parser 1218, query rewriter 1224, query optimizer 1230, query executor 1240, and non-query executor 1228 to coordinate the executing of the SQL statements 1216, and thus the arrowed lines represent an order as opposed to, for example, the parser 1218 calling the query rewriter 1224.

In the above description, numerous specific details such as resource partitioning/sharing/duplication implementations, types and interrelationships of system components, and logic partitioning/integration choices are set forth in order to provide a more thorough understanding. It will be appreciated, however, by one skilled in the art, that the invention may be practiced without such specific details. In other instances, control structures, logic implementations, opcodes, means to specify operands, and full software instruction sequences have not been shown in detail since those of ordinary skill in the art, with the included descriptions, will be able to implement what is described without undue implementation.

References in the specification to "one implementation," "an implementation," "an example implementation," etc., indicate that the implementation described may include a particular feature, structure, or characteristic, but every implementation may not necessarily include the particular feature, structure, or characteristic. Moreover, such phrases are not necessarily referring to the same implementation. Further, when a particular feature, structure, or characteristic is described in connection with an implementation, it is submitted that it is within the knowledge of one skilled in the art to affect such feature, structure, or characteristic in connection with other implementations whether or not explicitly described.

Bracketed text and blocks with dashed borders (e.g., large dashes, small dashes, dot-dash, and dots) may be used herein to illustrate optional operations and/or structures that add additional features to some implementations. However, such notation should not be taken to mean that these are the only options or optional operations, and/or that blocks with solid borders are not optional in certain implementations.

In the following description and claims, the term "coupled," along with its derivatives, may be used. "Coupled" is used to indicate that two or more elements, which may or may not be in direct physical or electrical contact with each other, co-operate or interact with each other.

While the flow diagrams in the figures show a particular order of operations performed by certain implementations, it should be understood that such order is exemplary (e.g., alternative implementations may perform the operations in a different order, combine certain operations, overlap certain operations, etc.).

A tenant includes a group of users who share a common access with specific privileges to a software instance. A multi-tenant architecture provides a tenant with a dedicated share of the software instance typically including one or more of tenant specific data, user management, tenant-specific functionality, configuration, customizations, non-functional properties, associated applications, etc. Multi-tenancy contrasts with multi-instance architectures, where separate software instances operate on behalf of different tenants.

As used herein, the term multi-tenant social networking system refers to those systems in which various elements of hardware and software of the database management system may be shared by one or more customers. For example, a given application server may simultaneously process requests for a great number of customers, and a given database table (e.g., feed materialization state table, the materialized feeds table) may store rows for a potentially much greater number of customers.

While the exemplary implementations may include a social networking system, and database systems (i.e., the non-relational database system 103 and the relational database system 102) capable of supporting multiple tenants, alternative implementations are within the spirit and scope of the appended claims (e.g., other database architectures may be used, such as ORACLE® or DB2® by IBM).

While the above description includes several exemplary implementations, those skilled in the art will recognize that the invention is not limited to the implementations described and can be practiced with modification and alteration within the spirit and scope of the appended claims. The description is thus illustrative instead of limiting.

What is claimed is:

1. A computer implemented method of dynamic materialization of a feed, the method comprising:
   receiving a request for the feed;
   determining a state of the feed, wherein the state of the feed can be one of an active state, an inactive state, an activating state, an inactivating state, and a disabled state;
   responsive to determining that the state of the feed is the inactive state, performing the following:
      causing the request for the feed to be processed at a first database system,
      causing materialization of the feed in a second database system with feed items of the feed from the first database system, wherein the second database system is separate from the first database system, and
      setting the state of the feed to the activating state;
   responsive to determining that the state of the feed is the active state, causing the request for the feed to be processed from the second database system; and
   responsive to determining that the state of the feed is the inactivating state, causing the request for the feed to be processed from the first database system.

2. The method of claim 1, wherein materialization of the feed in the second database system includes populating a materialized feeds table in the second database system with the feed items of the feed from the first database system.

3. The method of claim 1 further comprising:
responsive to determining that the state of the feed is the disabled state, performing the following:
causing the request for the feed to be processed from the first database system, and
causing an update of a materialized feeds table in the second database system to be postponed for a predetermined amount of time.

4. The method of claim 1 further comprising:
responsive to determining that a new feed item associated with the feed is to be added to the first database system, performing the following:
responsive to determining that the state of the feed is at least one of the active state and the activating state, requesting to add the new feed item to a materialized feeds table in the second database system in association with the feed.

5. The method of claim 4 further comprising:
responsive to detecting that a failure occurred when adding the new feed item to the materialized feeds table in the second database system, setting the state of the feed to the inactivating state causing feed items of the feed to be deleted from the materialized feeds table in the second database system.

6. The method of claim 5 further comprising:
responsive to determining that all feed items of the feed are deleted from the materialized feeds table, setting the state of the feed to the inactive state.

7. The method of claim 1 further including:
responsive to determining that the state of the feed is the activating state and that a materialized feeds table has been populated with at least a predetermined number of feed items from the feed, setting the state of the feed to the active state causing a next request for the feed to be processed from the second database system regardless of whether the materialized feeds table have been populated with all feed items of the feed or not.

8. The method of claim 1 further comprising:
responsive to determining that the state of the feed is the activating state and that materialization of the feed has failed, setting the state of the feed to the disabled state, and causing, as a result of the disabled state, requests for the feed to be processed from the first database system for a predetermined period of time.

9. One or more computing devices for dynamic materialization of a feed, the one or more computing devices comprising:
a memory storing one or more instructions; and
one or more processors configured to execute the one or more instructions to:
receive a request for the feed,
determine a state of the feed, wherein the state of the feed can be any one of an active state, an inactive state, an activating state, an inactivating state, and a disabled state,
responsive to determining that the state of the feed is the inactive state, perform the following:
to cause the request for the feed to be processed at a first database system,
to cause materialization of the feed in a second database system with feed items of the feed from the first database system, wherein the second database system is separate from the first database system, and
to set the state of the feed to the activating state,
responsive to determining that the state of the feed is the active state, cause the request for the feed to be processed from the second database system, and
responsive to determining that the state of the feed is the inactivating state, cause the request for the feed to be processed from the first database system.

10. The one or more computing devices of claim 9, wherein materialization of the feed in the second database system includes populating a materialized feeds table in the second database system with the feed items of the feed from the first database system.

11. The one or more computing devices of claim 9, wherein the one or more processors are configured to execute the one or more instructions to:
responsive to determining that the state of the feed is the disabled state, perform the following:
cause the request for the feed to be processed from the first database system, and
cause an update of a materialized feeds table in the second database system to be postponed for a predetermined amount of time.

12. The one or more computing devices of claim 9, wherein the one or more processors are configured to execute the one or more instructions to:
responsive to determining that a new feed item associated with the feed is to be added to the first database system, perform the following:
responsive to determining that the state of the feed is at least one of the active state and the activating state, request to add the new feed item to a materialized feeds table in the second database system in association with the feed.

13. The one or more computing devices of claim 12, wherein the one or more processors are configured to execute the one or more instructions to:
responsive to detecting that a failure occurred when adding the new feed item to the materialized feeds table in the second database system, set the state of the feed to the inactivating state causing feed items of the feed to be deleted from the materialized feeds table in the second database system.

14. The one or more computing devices of claim 13, wherein the one or more processors are configured to execute the one or more instructions to:
responsive to determining that all feed items of the feed are deleted from the materialized feeds table, set the state of the feed to the inactive state.

15. The one or more computing devices of claim 9, wherein the one or more processors are configured to execute the one or more instructions to:
responsive to determining that the state of the feed is the activating state and that a materialized feeds table has been populated with at least a predetermined number of feed items from the feed, set the state of the feed to the active state causing a next request for the feed to be processed from the second database system regardless of whether the materialized feeds table have been populated with all feed items of the feed or not.

16. The one or more computing devices of claim 9, wherein the one or more processors are configured to execute the one or more instructions to:
responsive to determining that the state of the feed is the activating state and that materialization of the feed has failed, set the state of the feed to the disabled state, and cause, as a result of the disabled state, requests for the feed to be processed from the first database system for a predetermined period of time.

17. A non-transitory computer-readable storage medium storing instructions executable by a computing device to perform a method of dynamic materialization of a feed, the method comprising:
- receiving a request for the feed;
- determining a state of the feed, wherein the state of the feed can be any one of an active state, an inactive state, an activating state, an inactivating state, and a disabled state;
- responsive to determining that the state of the feed is the inactive state, performing the following:
  - causing the request for the feed to be processed at a first database system,
  - causing materialization of the feed in a second database system with feed items of the feed from the first database system, wherein the second database system is separate from the first database system, and setting the state of the feed to the activating state;
- responsive to determining that the state of the feed is the active state, causing the request for the feed to be processed from the second database system; and
- responsive to determining that the state of the feed is the inactivating state, causing the request for the feed to be processed from the first database system.

18. The non-transitory computer-readable storage medium of claim 17, wherein materialization of the feed in the second database system includes populating a materialized feeds table in the second database system with the feed items of the feed from the first database system.

19. The non-transitory computer-readable storage medium of claim 17, wherein the method further comprises:
- responsive to determining that the state of the feed is the disabled state, performing the following:
  - causing the request for the feed to be processed from the first database system, and
  - causing an update of a materialized feeds table in the second database system to be postponed for a predetermined amount of time.

20. The non-transitory computer-readable storage medium of claim 17, wherein the method further comprises:
- responsive to determining that a new feed item associated with the feed is to be added to the first database system, performing the following:
  - responsive to determining that the state of the feed is at least one of the active state and the activating state, requesting to add the new feed item to the materialized feeds table in the second database system in association with the feed.

21. The non-transitory computer-readable storage medium of claim 20, wherein the method further comprises:
- responsive to detecting that a failure occurred when adding the new feed item to the materialized feeds table in the second database system, setting the state of the feed to the inactivating state causing feed items of the feed to be deleted from the materialized feeds table in the second database system.

22. The non-transitory computer-readable storage medium of claim 21, wherein the method further comprises:
- responsive to determining that all feed items of the feed are deleted from the materialized feeds table, setting the state of the feed to the inactive state.

23. The non-transitory computer-readable storage medium of claim 17, wherein the method further comprises:
- responsive to determining that the state of the feed is the activating state and that a materialized feeds table has been populated with at least a predetermined number of feed items from the feed, setting the state of the feed to the active state causing a next request for the feed to be processed from the second database system regardless of whether the materialized feeds table have been populated with all feed items of the feed or not.

24. The non-transitory computer-readable storage medium of claim 17, wherein the method further comprises:
- responsive to determining that the state of the feed is the activating state and that materialization of the feed has failed, setting the state of the feed to the disabled state, and causing, as a result of the disabled state, requests for the feed to be processed from the first database system for a predetermined period of time.

* * * * *